(12) United States Patent
May

(10) Patent No.: US 8,551,787 B2
(45) Date of Patent: Oct. 8, 2013

(54) MICROFLUIDIC DEVICES AND METHODS FOR BINARY MIXING

(75) Inventor: Andrew May, San Francisco, CA (US)

(73) Assignee: Fluidigm Corporation, South San Francisco, CA (US)

( * ) Notice: Subject to any disclaimer, the term of this patent is extended or adjusted under 35 U.S.C. 154(b) by 109 days.

(21) Appl. No.: 12/804,568

(22) Filed: Jul. 23, 2010

(65) Prior Publication Data

US 2011/0126910 A1 Jun. 2, 2011

Related U.S. Application Data

(60) Provisional application No. 61/271,754, filed on Jul. 23, 2009.

(51) Int. Cl.
*B01F 5/00* (2006.01)
(52) U.S. Cl.
USPC .............................. 436/180; 436/174; 436/43
(58) Field of Classification Search
USPC ............ 422/68.1, 81, 82, 500, 501, 502, 503, 422/504, 537; 436/174, 180, 43, 52, 53
See application file for complete search history.

(56) References Cited

U.S. PATENT DOCUMENTS

| | | | |
|---|---|---|---|
| 2,441,820 A | 5/1948 | Jewell | |
| 4,265,858 A | 5/1981 | Crum et al. | |
| 4,357,110 A | 11/1982 | Hope et al. | |
| 4,624,928 A | 11/1986 | Qureshi | |
| 4,688,946 A | 8/1987 | Latif et al. | |
| 4,705,405 A | 11/1987 | Williams | |
| 4,923,093 A | 5/1990 | Gerber | |
| 5,011,292 A | 4/1991 | Trapasso et al. | |
| 5,077,017 A | 12/1991 | Gorin et al. | |
| 5,158,751 A | 10/1992 | del Valle et al. | |
| 5,791,375 A | 8/1998 | Pan et al. | |
| 5,846,396 A | 12/1998 | Zanzucchi | |
| 6,203,183 B1 | 3/2001 | Mordaunt et al. | |
| 6,238,081 B1 | 5/2001 | Sand | |
| 6,540,895 B1 | 4/2003 | Spence et al. | |
| 6,682,702 B2 | 1/2004 | Barth et al. | |
| 6,883,957 B2 | 4/2005 | Gilbert et al. | |
| 6,885,982 B2 | 4/2005 | Harris et al. | |
| 6,951,632 B2 | 10/2005 | Unger et al. | |
| 7,042,649 B2 | 5/2006 | Quake et al. | |
| 7,059,348 B2 | 6/2006 | Nat | |
| 7,062,418 B2 | 6/2006 | Lee et al. | |
| 7,097,809 B2 | 8/2006 | Dam et al. | |

(Continued)

FOREIGN PATENT DOCUMENTS

| | | |
|---|---|---|
| WO | WO 01/67369 A2 | 9/2001 |
| WO | WO 2004/000721 A | 12/2003 |

(Continued)

OTHER PUBLICATIONS

Kong, David S. et al. "Parallel gene synthesis in a microfluidic device." Nucleic Acids Research (2007) 35 e61.*

*Primary Examiner* — Yelena G Gakh
*Assistant Examiner* — Christopher A Hixson
(74) *Attorney, Agent, or Firm* — Kilpatrick Townsend & Stockton LLP.

(57) ABSTRACT

The invention provides microfluidic devices and methods for carrying out sequential binary reactions.

18 Claims, 22 Drawing Sheets
(17 of 22 Drawing Sheet(s) Filed in Color)

(56) References Cited

U.S. PATENT DOCUMENTS

| | | |
|---|---|---|
| 7,161,736 B2 | 1/2007 | Legrand et al. |
| 7,192,629 B2 | 3/2007 | Lammertink et al. |
| 7,217,367 B2 | 5/2007 | Huang et al. |
| 7,232,109 B2 | 6/2007 | Driggs et al. |
| 7,248,413 B2 | 7/2007 | Quake et al. |
| 7,262,923 B2 | 8/2007 | Quake et al. |
| 7,279,146 B2 | 10/2007 | Nassef |
| 7,291,512 B2 | 11/2007 | Unger |
| 7,294,503 B2 | 11/2007 | Quake et al. |
| 7,368,163 B2 | 5/2008 | Huang et al. |
| 7,442,556 B2 | 10/2008 | Manger et al. |
| 7,476,363 B2 | 1/2009 | Unger et al. |
| 7,526,741 B2 | 4/2009 | Lee et al. |
| 7,604,965 B2 | 10/2009 | McBride et al. |
| 7,666,361 B2 | 2/2010 | McBride et al. |
| 7,678,547 B2 | 3/2010 | Eyal et al. |
| 7,691,333 B2 | 4/2010 | McBride et al. |
| 7,749,737 B2 | 7/2010 | McBride et al. |
| 7,792,345 B2 | 9/2010 | Taylor et al. |
| 7,815,868 B1 | 10/2010 | Jones et al. |
| 7,820,427 B2 | 10/2010 | Unger et al. |
| 7,833,708 B2 | 11/2010 | Enzelberger et al. |
| 7,837,946 B2 | 11/2010 | McBride et al. |
| 2003/0008308 A1 | 1/2003 | Enzelberger et al. |
| 2004/0171170 A1 | 9/2004 | Sandell |
| 2004/0180377 A1 | 9/2004 | Manger et al. |
| 2005/0053952 A1 | 3/2005 | Hong et al. |
| 2005/0164376 A1 | 7/2005 | Balagadde et al. |
| 2005/0208539 A1 | 9/2005 | Vann et al. |
| 2006/0172408 A1 | 8/2006 | Quake et al. |
| 2006/0233674 A1 | 10/2006 | Nelson |
| 2006/0281183 A1 | 12/2006 | Sun et al. |
| 2007/0134807 A1 | 6/2007 | Bao et al. |
| 2007/0224617 A1 | 9/2007 | Quake et al. |
| 2007/0248971 A1 | 10/2007 | Maerkl et al. |
| 2008/0050283 A1 | 2/2008 | Chou et al. |
| 2008/0075380 A1 | 3/2008 | Dube et al. |
| 2008/0108063 A1 | 5/2008 | Lucero et al. |
| 2008/0129736 A1 | 6/2008 | Sun et al. |
| 2008/0176211 A1 | 7/2008 | Spence et al. |
| 2008/0223721 A1 | 9/2008 | Cohen et al. |
| 2008/0230387 A1 | 9/2008 | McBride et al. |
| 2008/0264863 A1 | 10/2008 | Quake et al. |
| 2008/0274493 A1 | 11/2008 | Quake et al. |
| 2008/0281090 A1 | 11/2008 | Lee et al. |
| 2008/0292504 A1 | 11/2008 | Goodsaid et al. |
| 2009/0018195 A1 | 1/2009 | Balagadde |
| 2009/0035838 A1 | 2/2009 | Quake et al. |
| 2009/0069194 A1 | 3/2009 | Ramakrishnan |
| 2009/0142236 A1 | 6/2009 | Unger et al. |
| 2009/0147918 A1 | 6/2009 | Fowler et al. |
| 2009/0168066 A1 | 7/2009 | Hansen et al. |
| 2009/0239308 A1 | 9/2009 | Dube et al. |
| 2009/0291435 A1 | 11/2009 | Unger et al. |
| 2010/0104477 A1 | 4/2010 | Liu et al. |
| 2010/0120018 A1 | 5/2010 | Quake et al. |
| 2010/0120077 A1 | 5/2010 | Daridon |
| 2010/0154890 A1 | 6/2010 | Maerkl et al. |
| 2010/0166608 A1 | 7/2010 | Quan et al. |
| 2010/0171954 A1 | 7/2010 | Quake et al. |
| 2010/0183481 A1 | 7/2010 | Facer et al. |
| 2010/0184202 A1 | 7/2010 | McBride et al. |
| 2010/0187105 A1 | 7/2010 | Unger et al. |
| 2010/0196892 A1 | 8/2010 | Quake et al. |
| 2010/0197522 A1 | 8/2010 | Liu et al. |
| 2010/0200782 A1 | 8/2010 | Unger et al. |
| 2010/0230613 A1 | 9/2010 | Pieprzyk et al. |
| 2010/0263732 A1 | 10/2010 | Hansen et al. |
| 2010/0263757 A1 | 10/2010 | Fernandes et al. |
| 2010/0311060 A1 | 12/2010 | Facer et al. |
| 2010/0320364 A1 | 12/2010 | Unger et al. |

FOREIGN PATENT DOCUMENTS

| | | |
|---|---|---|
| WO | WO 2004/089810 A | 10/2004 |
| WO | WO 2005/107938 A | 11/2005 |
| WO | WO 2007/033385 A2 | 3/2007 |
| WO | WO 2007/044091 A2 | 4/2007 |
| WO | WO 2008/043046 A2 | 4/2008 |
| WO | WO 2008/089493 A | 7/2008 |
| WO | WO 2009/100449 A1 | 8/2009 |
| WO | WO 2010/011852 A1 | 1/2010 |
| WO | WO 2010/017210 A1 | 2/2010 |
| WO | WO 2010/077618 A1 | 7/2010 |
| WO | WO 2011/053790 A2 | 5/2011 |

* cited by examiner

MICROFLUIDIC DEVICES AND METHODS FOR BINARY MIXING

CROSS-REFERENCE TO RELATED APPLICATIONS

This application claims priority to U.S. provisional patent application No. 61/271,754, filed Jul. 23, 2009, the entire content of which is incorporated herein by reference. In addition, the entire content of copending U.S. application Ser. No. 12/018,138, filed on Jan. 22, 2008 and published as US Patent Pub. No. 2008/0223721 is incorporated herein by reference.

BACKGROUND

High density microfluidic devices are useful in a wide range of research, diagnostic and synthetic applications, including immunoassays, nucleic acid amplification and genomic analysis, cell separation and manipulation, and synthesis of radionuclides, organic molecules, and biomolecules. The advantages of microfluidic devices include conservation of reagents and samples, high density and throughput of sample analysis or synthesis, fluidic precision and accuracy, and a space reduction accompanying the replacement of counterpart equipment operating at the macrofluidic scale.

However, the manipulation of fluid volumes on the order of nanoliters and picoliters has required many new discoveries and design innovations. There are fundamental differences between the physical properties of fluids moving in large channels and those traveling through micrometer-scale channels. See, e.g., Squires and Quake, 2005, Rev. Mod. Phys. 77, 977-1026; Stone et al., 2004, Annu. Rev. Fluid Mech. 36:381-411; and Beebe et al., 2002, Ann. Rev. Biomed. Eng. 4:261-86. For example, at a microfluidic scale the Reynolds number is extremely small, reflecting a difference in the ratio of inertial to viscous forces compared to fluids at macroscale. Fluids flowing in microfluidic systems exhibit reduced turbulence, electro-osmotic and laminar flow properties, and in other ways behave differently than observed at a macroscale. There remains a need for new approaches to effecting efficient flow, containment and mixing of microfluids.

BRIEF SUMMARY OF THE INVENTION

In one aspect the invention provides a microfluidic method for carrying out sequential binary reactions, said method comprising:
a) providing a microfluidic device comprising a plurality of unit cells wherein each unit cell comprises a flow passage network comprising flow channels and chambers, said network comprising
first, second, third, fourth and fifth flow portions, a first valve disposed between the first and second portions, a second valve disposed between the second and third portions, a third valve disposed between the third and fourth portions, and a fourth valve disposed between the third and fifth portions;
wherein the volume of the fifth portion is greater than the volume of the third portion,
b) with the first valve closed, introducing a first solution M into the first portion;
c) with the first and second valves closed, introducing a second solution N into the second portion;
d) opening the first and second valves, and with the third and fourth valves closed, flowing solution M into said second portion thereby displacing at least a portion of solution N into said third portion, and flowing at least a portion of solution M into said third portion; whereupon the solutions M and N are mixed in the third portion thereby producing solution MN;
e) with the third valve closed, introducing a third solution O into the fourth portion;
f) closing the second valve and with the third and fourth valves open flowing solution O into said third portion thereby displacing at least a portion of solution MN into said fifth portion, and flowing at least a portion of solution O into said fifth portion; whereupon the solutions MN and O are mixed in the fifth portion thereby producing solution MNO.

In an aspect the first portion is contiguous with the second portion, the second portion is contiguous with the third portion, the third portion is contiguous with the fourth and fifth portions, and the fourth and fifth portions are not contiguous.

In an aspect the fifth portion is a chamber with a single intake aperture, wherein liquid in the fifth portion can flow out of the fifth portion only through the single intake aperture.

In an aspect said device comprises a sixth flow portion, said six flow portion is contiguous with the fifth portion, and a fifth valve disposed between the fifth and sixth portions.

In an aspect said first and second valves are commonly controlled such that they open and close simultaneously, and said third, and fourth valves are commonly controlled such that they open and close simultaneously.

In an aspect said first, second, third, and fourth valves each comprise an elastomeric membrane that can be deflected into a region of a microfluidic flow channel disposed between two flow portions, thereby preventing flow of liquid through said region from one flow portion to a contiguous flow portion, wherein each valve operates in response to an actuation force applied to a control channel that traverses the microfluidic flow channel.

In an aspect the control channel is orthogonal to the microfluidic flow channel.

In an aspect the first and second valves operate in response to an actuation force applied to a first control channel and the third and fourth valves operate in response to an actuation force applied to a second control channel.

In an aspect Step (e) is completed prior to the initiation of Step (d).

In an aspect Step (c) is carried out before or simultaneously with Step (b).

In an aspect essentially all of solution MN is displaced into the fifth portion.

In an aspect after Step (d) and before Step (f), with the second, third and fourth valves closed solution MN is heated.

In an aspect solution MN is thermocycled.

In an aspect after Step (f) the fourth valve is closed and solution MNO is heated.

In an aspect solution MNO is thermocycled.

In an aspect the third and fifth flow portions, but not the first, second or fourth portions comprise a reaction chamber with at least one cross-sectional dimension greater than 300 microns.

In an aspect the fifth flow portion is a reaction chamber comprising at least 12 internal edges.

In an aspect the method further comprise, with valves 3 and 4 closed, flowing a solution P from a sixth portion into the fifth portion displacing solution MNO out of the fifth portion into a seventh portion and flowing an amount of solution P into said seventh portion, whereupon the seventh portion contains a mixture of solution P and solution MNO.

In one aspect the invention provides a microfluidic device comprising a plurality of unit cells, wherein each unit cell comprises a flow passage network comprising flow channels, said network comprising a) first, second, third, fourth and fifth flow portions, wherein:
the first portion is contiguous with the second portion and is not contiguous with the third, fourth or fifth portions,
the second portion is contiguous with the first and third portions and is not contiguous with the fourth or fifth portions,
the third portion is contiguous with the second, fourth and fifth portions, and is not contiguous with the first portion, and
the fourth portion is contiguous with the third portion, and is not contiguous with the first, second, or fifth portions, and
the fifth portion is contiguous with the third portion, and is not contiguous with the first, second, or fourth portions;

b) first, second, third, and fourth valves wherein:
the first valve is disposed between the first and second portions,
the second valve is disposed between the second and third portions,
wherein the first and second valves are commonly controlled,
the third valve is disposed between the third and fourth portions, and
the fourth valve is disposed between the third and fifth portions;
wherein the third and fourth valves are commonly controlled.

In an aspect the volume of the fifth portion is greater than the volume of the third portion.

In an aspect the fifth portion is a chamber with at least 12 internal edges.

In an aspect said first, second, third, and fourth valves each comprise an elastomeric membrane that can be deflected into a region of a microfluidic flow channel disposed between two flow portions, thereby preventing flow of liquid through said region from one flow portion to a contiguous flow portion, wherein each valve operates in response to an actuation force applied to a control channel that traverses the microfluidic flow channel, and wherein the first and second valves operate in response to an actuation force applied to a first control channel and the third and fourth valves operate in response to an actuation force applied to a second control channel.

In an aspect each valve operates in response to an actuation force applied to a control channel that is orthogonal to the microfluidic flow channel.

In an aspect each control channel is substantially linear.

In an aspect n a first flow channel links the fourth portion of said unit cell with a fourth or fifth portion of a second unit cell and a second flow channel links the fifth portion of said unit cell with a fourth or fifth portion of a third unit cell.

In an aspect the fourth portion of said unit cell is fluidically linked to a fourth or fifth portion of a second unit cell, and wherein the fifth portion of said unit cell is fluidically linked to a fourth or fifth portion of a third second unit cell.

In an aspect the unit cell is adjacent in the array to the second unit cell and/or the third unit cell.

In one aspect the invention provides a microfluidic device comprising an array of X rows and Y columns of unit cells for carrying out binary mixing reactions, wherein each unit cell comprises a flow passage network comprising flow channels, said network comprising valves for control of liquid flow through the channels, wherein said valves are formed by deflection of an elastomeric membrane into a microfluidic flow channel in response to a change in pressure in a control channel that traverses the flow channel and is separated from the flow channel by the elastomeric membrane, and said network comprises a) first, second, third, fourth and fifth flow channel portions, wherein:
the first portion is contiguous with the second portion and is not contiguous with the third, fourth or fifth portions,
the second portion is contiguous with the first and third portions and is not contiguous with the fourth or fifth portions,
the third portion is contiguous with the second, fourth and fifth portions, and is not contiguous with the first portion, and
the fourth portion is contiguous with the third portion, and is not contiguous with the first, second, or fifth portions, and
the fifth portion is contiguous with the third portion, and is not contiguous with the first, second, or fourth portions;

b) first, second, third, and fourth elastomeric valves, wherein:
the first valve is disposed between the first and second portions,
the second valve is disposed between the second and third portions,
the third valve is disposed between the third and fourth portions, and
the fourth valve is disposed between the third and fifth portions;
and wherein the first and second valves of each unit cell in a row are controlled by actuation of a first common control channel, and the third and fourth valves of each unit cell in a row are controlled by actuation of a second common control channel.

In one aspect a column bus line is fluidically connected to the second portions of a plurality of unit cells in a column.

In an aspect a said column bus line comprises valves defined by the intersection of the bus line and the second common control channel.

In an aspect a row bus line is fluidically connected to the first portions of a plurality of unit cells in a row.

In an aspect said row bus line and said first portions are in different layers of the device and are fluidically connected by a communication via.

In an aspect an array bus line is fluidically connected to the fourth portions of a plurality of unit cells in an array.

In an aspect said array bus line comprises valves defined by the intersection of the bus line and the second common control channel.

In an aspect in (XY-2) unit cells the fourth portion is fluidically linked to the fourth or fifth portion of a first different unit cell and the fifth portion is fluidically linked to the fourth or fifth portion of a second different unit cell.

In an aspect a first flow channel links the fourth portion of said unit cell with a fourth or fifth portion of a second unit cell and a second flow channel links the fifth portion of said unit cell with a fourth or fifth portion of a third unit cell.

In one aspect the invention provides a method for transferring a solution from the third portion of a first unit cell to a fourth or fifth portion of a different unit cell in a device according to claim 28, said method comprising:
with valve 2 closed and valves 3 and 4 open, flowing a push fluid through the flow path defined by the sequence
i) fourth portion of the first unit cell
ii) third portion of the first unit cell iii) fifth portion of the first unit cell iv) channel linking fifth portion of the first unit cell with the fourth or fifth portion of the second unit cell v) fourth or fifth portion of the second unit cell, wherein valve 2 of the second unit cell is closed, whereby the push fluid displaces the solution from the third portion though the flow path to the fourth or fifth portion of the second unit cell.

In an aspect the method further comprises with valve 2 closed and valves 3 and 4 open, flowing the push fluid through the flow path defined by the sequence i) fourth portion of the second unit cell ii) third portion of the second unit cell iii) fifth portion of the second unit cell iv) channel linking fifth portion of the second unit cell with the fourth or fifth portion of a third unit cell or i) fifth portion of the second unit cell ii) third portion of the second unit cell iii) fourth portion of the second unit cell iv) channel linking fourth portion of the second unit cell with the fourth or fifth portion of a third unit cell.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Introduction

Figure 1:
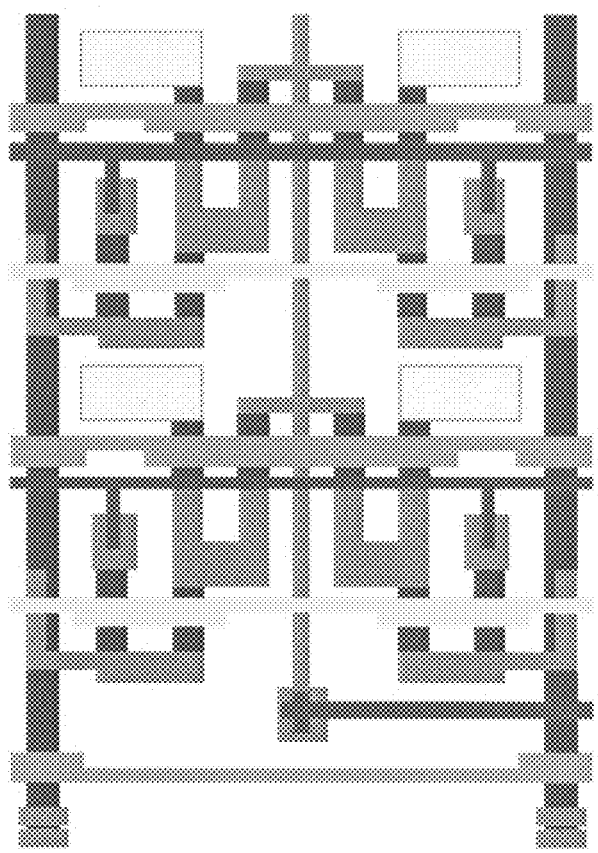
FIG. 1 is a color figure illustrating a section of a microfluidic device, showing a 2×2 array of unit cells useful for carrying out two sequential binary mixing reactions. Control Line 1 is yellow, Control Line 2 is orange, a reaction chamber is shown as a pink rectangle, a Row Bus Line is shown in red.

Recently developed microfluidic methods and devices, sometimes referred to as "Fluidigm Carry Slug (FCS) methods and devices," provide efficient mixing of fluid volumes and permit precise metering of the volumes to be mixed. FCS devices and methods are described hereinbelow and in copending unpublished application Ser. No. 12/018,138 filed Jan. 22, 2008 which is incorporated herein by reference in its entirety. The entire specification of application Ser. No. 12/018,138 is appended below.

In one aspect, the FCS method for mixing solutions involves introducing a first solution into a segment of a flow channel, where the flow channel is in fluidic communication with a reaction chamber; flowing a second solution through the segment, thereby displacing the first solution into the reaction chamber; and flowing the second solution into the reaction chamber, thereby mixing the first and second solutions in the reaction chamber. Empirical studies have demonstrated the FCS method provides superior results in certain microfluidic assays.

The present application is directed to new methods and devices in which the FCS principal is used. In one aspect, methods and devices for carrying out sequential binary mixing reactions is provided. In one aspect, methods and devices for carrying harvesting products of sequential or parallel binary mixing reactions is provided.

"Binary mixing," as used herein, refers to mixing of two or more, usually two, solutions. In general, each solution contains one or more components (e.g., primers, antibodies, probes, labels, substrates, catalysts, ions, reactants, monomers, DNA, protein, antibodies, cells, virions, and the like) that can be combined to provide useful information or a desired product. Optionally, upon combination (or mixing) of the solutions, the mixture may be manipulated (e.g., heated, thermocycled, irradiated, incubated, etc.) to initiate, enhance, catalyze, facilitate or terminate a reaction between the components of the combined solutions to produce a desired product. Examples of products include, without limitation, ligand-antiligand complexes (e.g., when one solution contains a ligand and the second contains an antiligand), nucleic acid amplicons (e.g., when one solution contains reagents suitable for a polymerase chain reaction and the second contains a nucleic acid target), biological macromolecules (e.g., when one solution contains cells and a second solution contains lysis reagents), heteropolymers (e.g., when one solution contains first monomers and a second solution contains second monomers), and products of chemical interactions (e.g., interactions in which include molecules or radicals combine to form larger molecules, larger molecules break apart to form two or more smaller molecules, or which involve and rearrangements of atoms within molecule). A variety of specific examples of components are provided hereinbelow, but it will be clear that the invention is not limited to any particular combination.

For convenience in this disclosure, except where indicated, no distinction is drawn between a mixture of two solutions each containing reagents or reactants (e.g., solution M containing reactant A and solution containing reactant B can be mixed to generate a solution MN containing A+B) and the product of a chemical reaction or physical transformation or change in state generated in the mixture. For example, if reagents A and B reaction when heated to produce product C, the mixture MN containing A+B will, upon heating, become the mixture MN contain product C. In either case the result of mixing solutions M and N can be referred to as MN.

In certain embodiments of the invention sequential mixing of three or more solutions is carried out. For example, in a first step solution M is combined with solution N to produce the mixture solution MN, and in a second step solution MN is combined with solution O to produce the mixture solution MNO. For example, in a first reaction a DNA sample ("M") and reagents for whole-genome preamplification of the DNA ("N") can be combined and thermocycled to produce a mixture of amplified sequences, and in a second reaction the mixture ("MN") can be combined with target-specific primers and suitable amplification reagents ("O") for specific amplification of a target sequence.

In certain embodiments a number of binary reactions are carried out on a microfluidic "chip" containing an array of reaction chambers in which mixing occurs, and the mixtures (e.g., containing products of interest) are harvested from all or a subset of the reaction chambers in the array and collected (e.g., pooled in a chamber or well on the chip, or transferred off-chip).

Exemplary Microfluidic Device

This section describes an exemplary microfluidic device of the invention, as shown generally in FIG. 1. It will be appreciated although they are useful for illustration, the present invention is not limited to the particular architecture show in the figures.

In this section general familiarity with construction and use of multilayer microfluidic devices and elastomeric valves will be assumed. Additional guidance is provided below and in references cited herein, as well as other scientific and patent publications readily available to the ordinarily skilled artisan. Multilayer elastomeric devices have several advantages over devices made using other technologies. One advantage is the availability of integrated elastomeric valves to regulate movement of solutions. Integrated elastomeric valves are characterized by an elastomeric membrane that may be deflected into (or out of) a flow channel to block or permit movement of solutions through the channel. In one approach the flow channel and a control channel (or equivalently "control line" or "valve line") are separated by an elastomeric segment that can be deflected into or retracted from the flow channel in response to an actuation force applied to the control channel. See, US 20050072946, U.S. Pat. No. 6,408,878, US 20020127736 and U.S. Pat. No. 6,899,137 and other references cited herein below. A second advantage is the ability when using an elastomeric device to use blind filling to load a chamber, channel or channel segment. Notwithstanding these advantages, the methods of the present invention may be carried out using other types of microfluidic devices, including hybrid devices (e.g., comprising elastomeric valves and vents, and nonelastomeric materials to define flow paths and/or chambers), devices using nonelastomeric valves (e.g., valves fabricated using thermoresponsive polymer gels), and devices fabricated wholly from nonelastomeric materials.

FIG. 1 illustrates a section of a microfluidic device, showing a 2×2 array of unit cells useful for carrying out two sequential binary mixing reactions. The figure is color coded to distinguish both elements of the unit cells and the layer(s) in which the element is situated.

Figure 2:
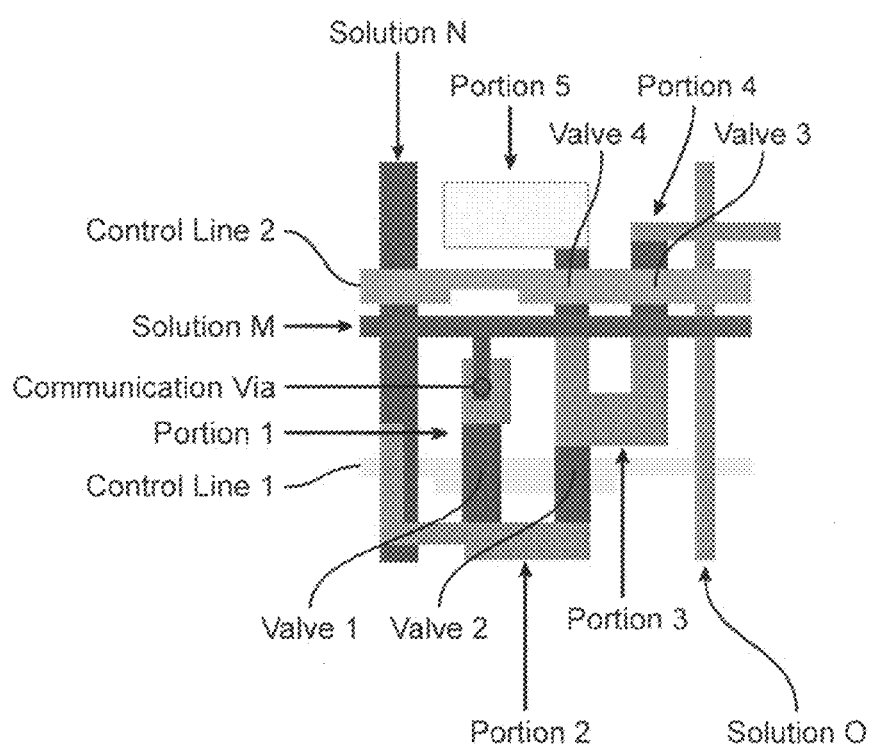
FIG. 2 is a color figure illustrating an exemplary unit cell with valves (1-4), control lines (1-2), portions (1-5), a communication via, and the lines carrying Solutions M, N and O labeled.

FIG. 2 shows an exemplary unit cell.

The unit cell shown comprises sections of two control lines, six valves (two controlled by Control Line 1 and four controlled by Control Line 2) and a flow passage network comprising fluidically connected flow channels and chambers. As used in this context, "flow channel" refers to flow channels within a layer of a microfluidic device and linking segments (e.g., communication vias) which may traverse layers. Flow channels are tubes through which a solution (e.g., an aqueous solution) can flow in which the length dimension is typically several or many times greater than the cross-sectional (width and depth) dimensions. The flow channel may have a circular, rectangular or other shape cross section(s), and may have differing cross-sections or dimensions along its length. A microfluidic flow channel is characterized by cross-sectional dimensions less than 1000 microns. Usually at least one, and most usually all, cross-sectional dimensions are less than 500 microns. Frequently at least one, and often all, cross-sectional dimensions are less than 250 microns. Other exemplary flow channel dimensions are discussed herein below. A "linking segment" refers a channel segment that links channel segments in different layers of a device or links a channel segment in one layer to a reaction chamber in a different layer(s). A "fluid communication via" is an example of a linking segment and refers to flow channel segment in an multilayer device that connects fluidic elements in different layers of the device and which is fabricated by drilling, ablating (laser punching), molding or embossing a tunnel through the material from which the device is constructed. Microfluidic valves are generally disposed in flow channels.

A reaction chamber may have a variety of shapes (cubical, cylindrical, etc.) and a volume in the range 1 nL to 1 uL, more often in the range 4 nL to 200 nL. Usually at least one dimension is at least 50 um, and usually at least 100 um. The cavity of a reaction chamber may be disposed in several different layers of a microfluidic device.

The flow passage network comprises "flow portions" (or "portions") which are regions of the network described in greater detail below. As will be apparent, a flow portion can include a flow channel, a chamber, or both.

Figure 3:
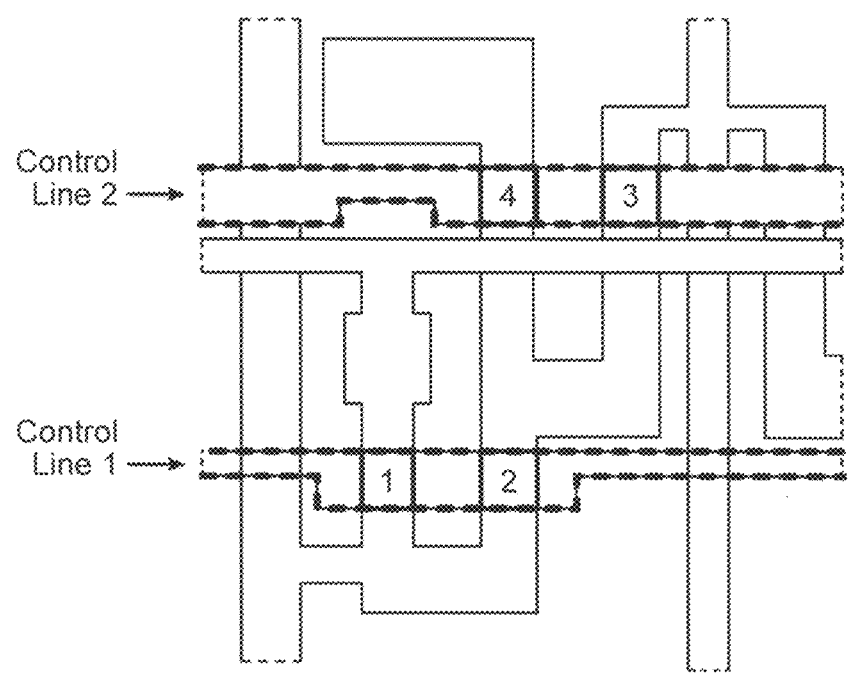
FIG. 3 is a black and white schematic of a unit cell drawn to highlight Control Line 1, which can be pressurized to close valves 1 and 2, and Control Line 2, which can be pressurized to close valves 3 and 4.

FIG. 3 is drawn to highlight Control Line 1, which can be pressurized to close valves 1 and 2, and Control Line 2, which can be pressurized to close valves 3 and 4. In this illustration, Control Lines 1 and 2 are in one elastomeric layer and the flow channels are in a different layer, with an elastomeric membrane separating the two channels. Valves are formed by deflection of an elastomeric membrane into a microfluidic flow channel in response to a change in pressure in a control channel that traverses the flow channel and is separated from the flow channel by the elastomeric membrane. In this schematic, valves exist where a thicker region of a control line is orthogonal to a flow channel. The thinner regions of the control lines do not deflect a membrane into the orthogonal flow channels.

Figure 4:
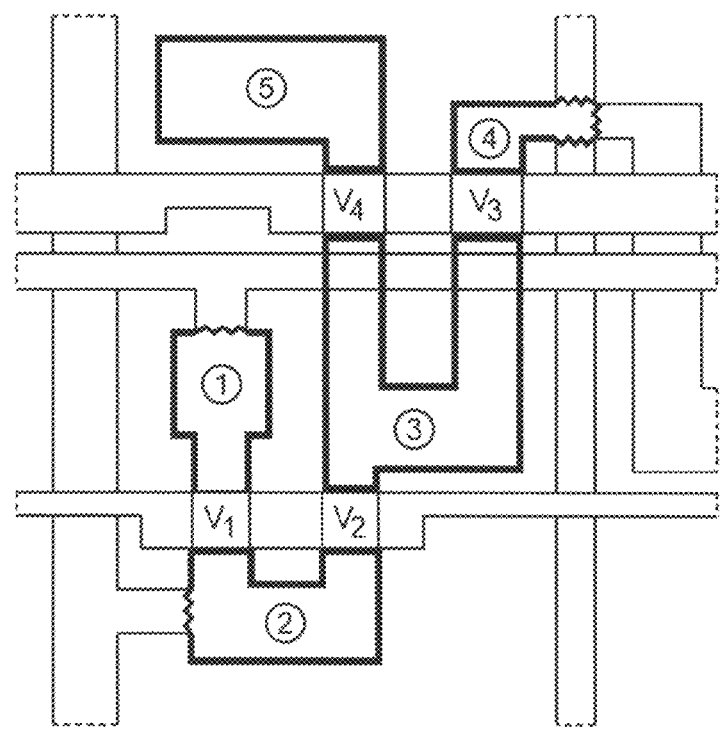
FIG. 4 is a black and white schematic of a unit cell drawn to highlight "flow portions."

FIG. 4 is drawn to highlight "flow portions" in the unit cell. As used herein, a "flow portion" is a section of the network of fluidically connected flow channels, with at least one boundary defined by a valve. For example, flow portion 3 is bounded by valves 2, 3 and 4; flow portion 5 is bounded by valve 4, flow portion 1 is bounded at one side by valve 1, flow portion 4 is bounded at one side by valve 3 and valves 1 and 3 bound two sides of flow portion 2.

As illustrated in FIG. 4, the boundaries of flow portion 3, for example, are defined by the position of three valves along with the walls of the channels and/or chamber that makes up portion 3. In contrast for flow portions 1, 2 and 4, the boundaries of the portion are not necessarily defined by valves that if closed fluidically isolate the portion, as illustrated by the wavy lines in FIG. 4.

Where useful for description, portion 2 can be considered bounded by valves 1 and 2, and two valves formed in the column bus line (described below). Where useful for description, portion 4 can be considered bounded by valve 3 and a two valves formed in the array bus line (described below).

Although the invention is not limited to a particular configuration, in preferred embodiments the flow portions in which mixing occurs (e.g., portions 3 and 5 in FIG. 4) comprise a chamber in which mixing of solutions and, optionally, a reaction(s) between the components carried in the solutions, occurs. The chambers are fluidically linked to flow channels in which valves are disposed.

In some designs, portion 5 is a chamber with a single intake aperture, wherein liquid in the fifth portion can flow out of the fifth portion only through the single intake aperture and can be fluidically isolated by closing a single valve (valve 4). In other designs the device includes additional flow portion(s) and valve(s) are disposed between the fifth and additional portions. See the discussion of "Multiples" infra. In this design the fifth portion can be defined by the position of the fourth and additional valves.

Figure 5:
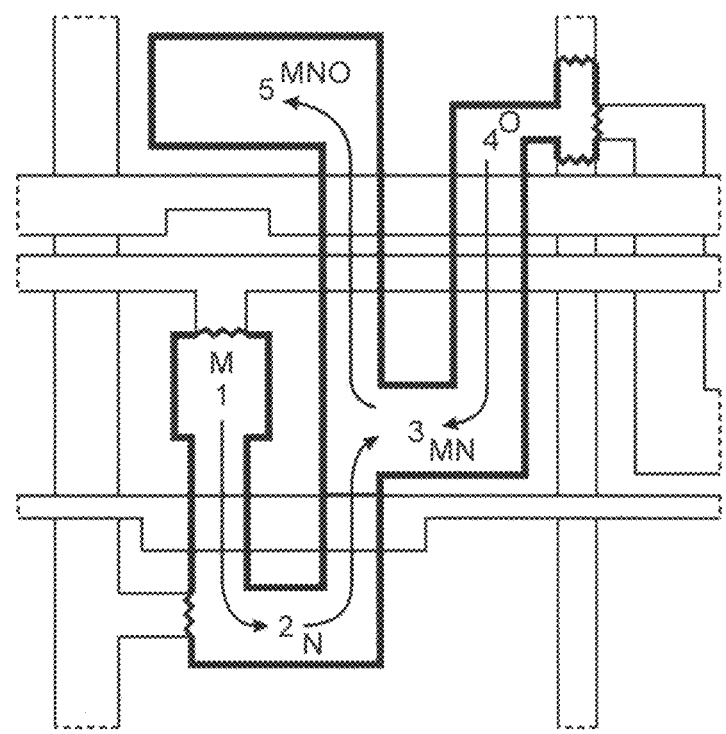
FIG. 5 is a black and white schematic illustrating movement of solutions between Flow Portions.

The operation of the device is discussed in detail in the following sections, but it facilitates understanding to note now that in one embodiment, Flow Portion 1 is loaded with Solution M and Flow Portion 2 is loaded with Solution N. Solution N is pushed by Solution M into Flow Portion 3, where the mixture MN may optionally be incubated, heated or otherwise treated to produce a reaction product(s). Solution O is loaded into Flow Portion 4 and Solution MN is pushed by Solution O into Flow Portion 5, where the mixture MNO may optionally be incubated, heated or otherwise treated to produce a reaction product(s). See FIG. 5.

Thus, in one aspect the a microfluidic device comprising a plurality of unit cells is provided, wherein each unit cell comprises a flow passage network comprising flow channels and chambers, said network comprising a) first, second, third, fourth and fifth flow portions, wherein:
   the first portion is contiguous with the second portion and is not contiguous with the third, fourth or fifth portions,
   the second portion is contiguous with the first and third portions and is not contiguous with the fourth or fifth portions,
   the third portion is contiguous with the second, fourth and fifth portions, and is not contiguous with the first portion, and
   the fourth portion is contiguous with the third portion, and is not contiguous with the first, second, or fifth portions, and
   the fifth portion is contiguous with the third portion, and is not contiguous with the first, second, or fourth portions;

b) first, second, third, and fourth valves wherein:
   the first valve is disposed between the first and second portions,
   the second valve is disposed between the second and third portions,
   the third valve is disposed between the third and fourth portions, and
   the fourth valve is disposed between the third and fifth portions.

In operation of the device solution M is delivered to the first portion via a bus line and is under pressure or is pushed against closed valve 2 such that when valve 2 is opened solution N is displaced into the third portion. Referring again to FIG. 4, the volume of solution N that enters the third portion, delineated in the figure, is sometimes referred to as the slug volume (SV). Solution in the region of the second on the opposite side of the wavy line is a "non-flowing volume" (NFV), which does not enter the third portion. It is within the ability of one of ordinary skill in the microfluidic arts to select dimensions for the SV region and the NFV region to effect this transfer. For example, the NFV region typically has smaller cross-sectional dimensions than the SV region, and the direction of flow from the NFV region to the SV region may be perpendicular to the direction of flow from the first portion to the SV region of the second portion.

The volume of the fifth portion is greater than the volume of the third portion. It will be apparent that this allows substantially all of mixture MN and an amount of solution O to enter the fifth portion and mix together to form mixture MNO. Similarly, the volume of the third portion is larger than the volume of the region of the second portion that is delineated in FIG. 5 (this portion is sometimes referred to as the slug path) allowing substantially of the slug volume and an amount of solution M to enter the third portion and form the mixture MN. In preferred embodiments, to achieve complete transfer of the solution from the slug path into the third portion ("the reaction chamber"), it is desirable that the reaction chamber volume be at least 2 times that of the slug volume (volume of solution M introduced into the chamber). Preferably the reaction chamber volume is at least 3 times the slug volume, more preferably at least 4 times, often at least 5 times, at least 6 times, at least 7 times, at least 8 times, or at least 9 times the slug volume.

As used herein, two flow portions are "contiguous" when they are separated only by a single valve (or the region of a channel into which a membrane is deflected to form a valve). In some designs, two flow portions are not directly contiguous. For example, rather a single valve may be replaced with two valves close to each other, with a short channel length between them. In another example a one-way or check valve may be used in addition to a valve actuated by pressurization of a control channel. See WO 08/043046 "Microfluidic Check Valves" for an exemplary design.

In an embodiment, no valves are disposed in the second portion between the first and second valves. In general, no valves are disposed in the third portion between any pair of said second, third and fourth valves.

In an embodiment, the first and second valves are commonly controlled and the third and fourth valves are commonly controlled. Valves (e.g. pairs of valves) are commonly controlled when they open or close in response to same actuating signal. Typically commonly controlled valves open and close essentially simultaneously in response the the actuation signal. Common control can be achieved by using a common control channel for elastomeric devices, or using suitable methods in devices in which other types of valves are used.

In one embodiment the first, second, third, and fourth valves each comprise an elastomeric membrane that can be deflected into a region of a microfluidic flow channel disposed between two flow portions, thereby preventing flow of liquid through said region from one flow portion to a contiguous flow portion, wherein each valve operates in response to an actuation force applied to a control channel that traverses the microfluidic flow channel, and wherein the first and second valves operate in response to an actuation force applied to a first control channel and the third and fourth valves operate in response to an actuation force applied to a second control channel. In some embodiments each valve operates in response to an actuation force applied to a control channel that is orthogonal to the microfluidic flow channel.

In some embodiments the fifth portion is a chamber with a single intake aperture, wherein liquid in the fifth portion can flow out of the fifth portion only through the single intake aperture. That is, the fifth portion is a "dead end."

In some embodiments, discussed below, content of the fifth portion (e.g., mixture MNO) is combined with a fourth solution P. For example, the unit cell may comprises a sixth flow portion contiguous with the fifth portion, and a fifth valve disposed between the fifth and sixth portions.

In some embodiments, discussed below, the content of the fifth portion (e.g., mixture MNO) is harvested or collected.

Operation of Device for Sequential Binary Reactions

In one aspect the invention provides a microfluidic method for carrying out sequential binary reactions, said method comprising:

a) providing a microfluidic device comprising a plurality of unit cells
wherein each unit cell network comprises
a flow passage network, said network comprising
first, second, third, fourth and fifth flow portions, a first valve disposed between the first and second portions, a second valve disposed between the second and third portions, a third valve disposed between the third and fourth portions, and a fourth valve disposed between the third and fifth portions;
wherein the volume of the fifth portion is greater than the volume of the third portion,
b) with the first valve closed, introducing a first solution M into the first portion;
c) with the first and second valves closed, introducing a second solution N into the second portion;
d) opening the first and second valves, and with the third and fourth valves closed, flowing solution M into said second portion thereby displacing at least a portion of solution N into said third portion, and flowing at least a portion of solution M into said third portion; whereupon the solutions M and N are mixed in the third portion thereby producing solution MN;
e) with the third valve closed, introducing a third solution O into the fourth portion;
f) closing the second valve and with the third and fourth valves open flowing solution O into said third portion thereby displacing at least a portion of solution MN into said fifth portion, and flowing at least a portion of solution O into said fifth portion; whereupon the solutions MN and O are mixed in the fifth portion thereby producing solution MNO.

In an embodiment the first portion is contiguous with the second portion, the second portion is contiguous with the third portion, and the third portion is contiguous with the fourth and fifth portions.

In some cases the fifth portion is a chamber with a single intake aperture, wherein liquid in the fifth portion can flow out of the fifth portion only through the single intake aperture. As discussed below Preferably the first and second valves are commonly controlled and the third and fourth valves are commonly controlled. In one design, the first, second, third, and fourth valves each comprise an elastomeric membrane that can be deflected into a region of a microfluidic flow channel disposed between two flow portions, thereby preventing flow of liquid through said region from one flow portion to a contiguous flow portion, wherein each valve operates in response to an actuation force applied to a control channel that traverses (e.g., is orthogonal to) the microfluidic flow channel. As used herein "traverse" has its normal meaning and describes a relationship between channels in different planes (e.g., different layers of a multilayer device) that cross. Channels that cross at right angles are orthogonal. Preferably the first and second valves operate in response to an actuation force applied to a first control channel and the third and fourth valves operate in response to an actuation force applied to a second control channel.

In a device with an array of unit cells, each subgrouping (e.g., row) of unit cells may be associated with a first control channels and a second control channel. Preferably all first control channels in the array are commonly controlled and all second control channels in the array are commonly controlled, facilitating the coordinated movement and mixing of solutions in the device.

Bus Lines

A "bus line" is a flow channel in fluidic communication with a source reservoir and with the channel networks of a plurality of unit cells. Usually the plurality comprises at least 10 unit cells, often at least 30 unit cells, often at least 40 unit cells, and sometimes at least 96 unit cells. As is illustrated in FIG. 6, bus lines may be used in devices of the invention to fill portions 1, 2, 4 and as well as other portions (see below).

Although for convenience bus lines can be referred to as "column," "row," or "array" bus lines. It will be recognized that while terms "column" and "row" have their usual meanings in descriptions of arrays, no further function or structure is intended by such references. For example, reference to first bus lines that link columns of unit cells and second bus lines that link rows of unit cells would be equivalent to a reference to second bus lines that link rows of unit cells and first bus lines that link columns of unit cells. Moreover, unless otherwise specified, rows and columns do not require strict alignment, although such alignment provides design advantages. Unit cells in a row, for example, can be staggered or offset from a central line relative to each other. Further, the term "array" is not limited to arrangements of rows and column. For example, unit cells in a unit cell array could be arranged in concentric circles, along radii of the outermost circle.

Figure 6:
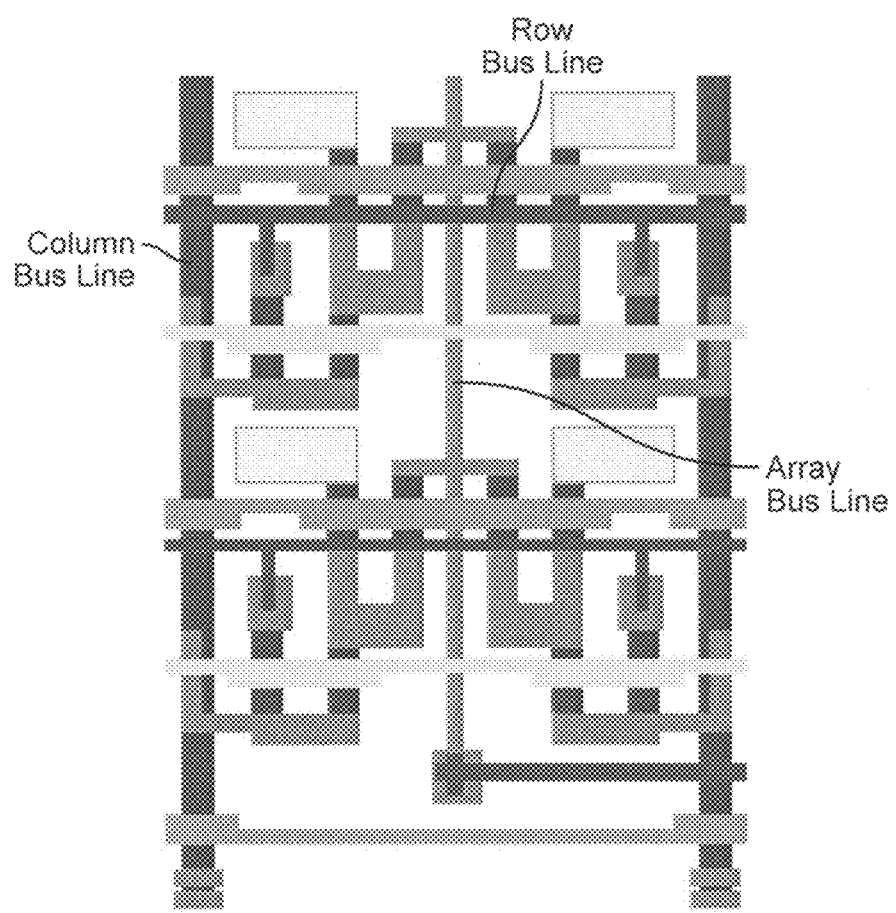
FIG. 6 is a color figure showing the section of FIG. 1, with Column, Row and Array Bus Lines identified.

As illustrated in FIG. 6, in some embodiments the device comprises one or more (usually several) row bus lines, where the row bus line is fluidically connected to the first portions of a plurality of unit cells in a row. Using the terminology presented above, a column bus line is fluidically connected to a source of solution M. In some designs, as illustrated in FIG. 6, the row bus line and the first portions are in different layers of the device and are fluidically connected by a fluid communication via.

As illustrated in FIG. 6, in some embodiments the device comprises one or more (usually several) column bus lines, where each column bus line is fluidically connected to the second portions of a plurality of unit cells in a column. Using the terminology presented above, a column bus line is fluidically connected to a source of solution N. In some designs, as illustrated in FIG. 6, the column bus line comprises valves defined by the intersection of the bus line and the second common control channel.

As illustrated in FIG. 6, in some embodiments the device comprises one or more (usually several) array bus lines, where each array bus line is fluidically connected to the fourth portions of a plurality of unit cells in an array. Using the terminology presented above, an array bus line is fluidically connected to a source of solution O. In some designs the array bus line comprises valves defined by the intersection of the bus line and the second common control channel.

Movement of Fluid

Fluids (e.g., solutions M, N and O) may be transported in a device using any of a number of methods. In some embodiments a pump is contained on or integral with the device itself. One example is a peristaltic pump, such as those described in U.S. Pat. No. 6,408,878 B2, are used. Alternatively a pump or pressure source can be external to the chip.

Suitable pumps can be electronic, electrostatic, magnetic, mechanical, syringe, pneumatic, or peristaltic.

Example

FIGS. 7A-7E illustrate the use of a microfluidic device of the invention to carry out two consecutive binary reactions. These figures show the valve status but do not show the movement of solutions. By convention, presenting a control line beneath a flow channel indicates that valves are open, and presenting a control line above a flow channel indicates that valves are open.

Figure 7A:
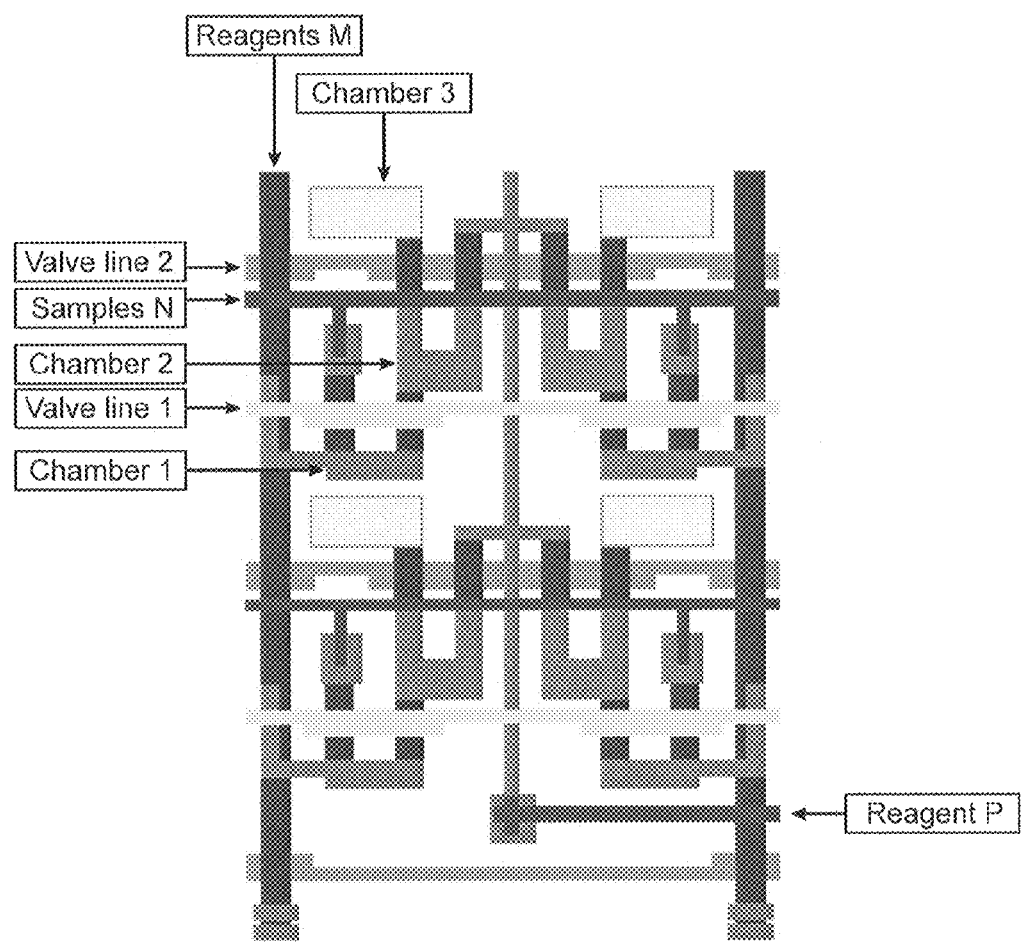
FIGS. 7A, 7B, 7C, 7D and 7E are color figures showing valve confirmation of showing a 2×2 array of unit cells during Steps 1, 2, 3, 4 and 5, respectively, of a binary reaction.

Step 1 is illustrated in FIG. 7A. With Control Line 1 pressurized (valves 1 and 2 closed) and Control Line 2 unpressurized (valves 3 and 4 open), Solution M is introduced via a bus line and fills Portion 2 of each unit cell in a column. Solution N is introduced via bus line N and fills Portion 1 of each unit cell in a row. (In the Figure Solution N flows from the bus line through a communication via and is pressurized against Valve 1.)

Figure 7B:
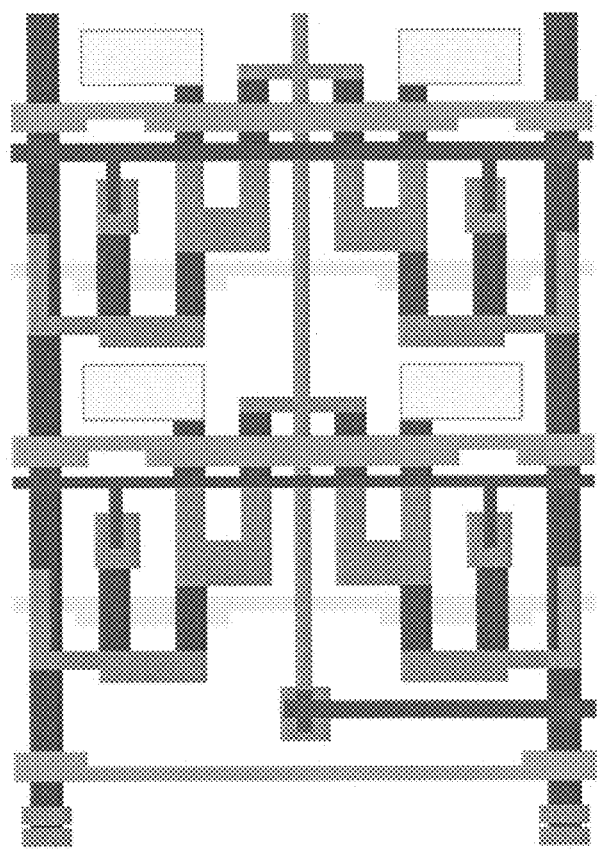

Step 2 is illustrated in FIG. 7B. Valves 1 and 2 are opened by releasing pressure on Control Line 1, and Valves 3 and 4 are closed by pressurizing Control Line 2. Upon opening Valves 1 and 2, Solution N, under pressure, pushes (i.e., displaces) Solution M into Portion 3 filing Portion 3. The fluid capacity of Portion 3 controls the amounts of Solutions M and N that enter Portion 3. The unit cell may be designed so that a desired amount of each solution is metered into Portion 3. Note that the valves formed at the intersection of the Solution M bus line and Control Line 2 prevent flow through the bus line into the U-shaped region of Portion 2 delineated in FIG. 4. Thus, although this delineated region is not bounded by a third valve on the side denoted by the "wavy" line, in this design only the volume of the delineated region (approximately) will be pushed into Portion 3. The volume of Solution N that enters Portion 3 is equal to the difference between the volume of Portion 3 and Portion 2.

Figure 7C:
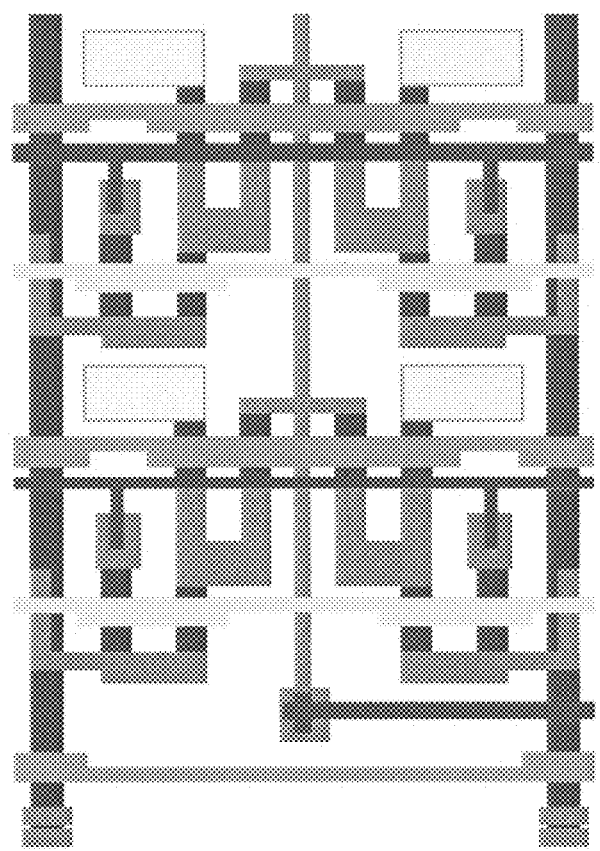

Step 3 is illustrated in FIG. 7C. Valves 1 and 2 are closed, and valves 3 and 4 remain closed. The solution MN is incubated in Portion 3. As noted, optionally heat may be applied to the MN solution in Portion 3. With Valve 3 closed, Solution O is loaded under pressure against Valve 3. As illustrated in the figure, like Solutions M and N, Solution O is typically loaded via a bus line, shown here linked to each of the four unit cells shown. It will be apparent to the reader that Solution O can be introduced using a variety of routes, and can be introduced at any point after Valve 3 is closed.

Figure 7D:
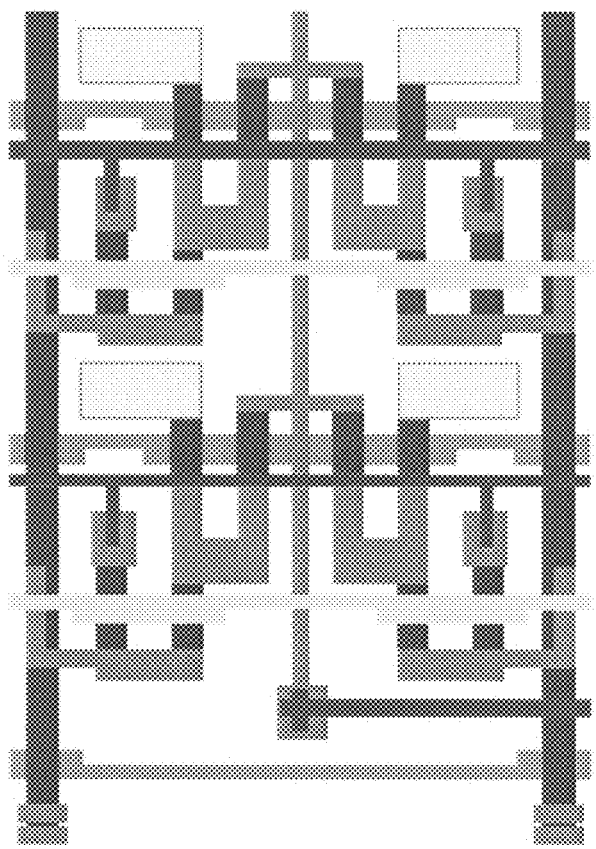

Step 4 is illustrated in FIG. 7D. Valves 3 and 4 are opened and Valves 1 and 2 remain closed. Solution O in Portion 4, under pressure, pushes (i.e., displaces) Solution MN into Portion 5. The fluid capacity of Portion 5 is greater that that of Portion 3, so that a metered amount of Solution O (i.e., equal to the difference in fluid capacity of Portion 5 and Portion 3) enters Portion 5.

Figure 7E:
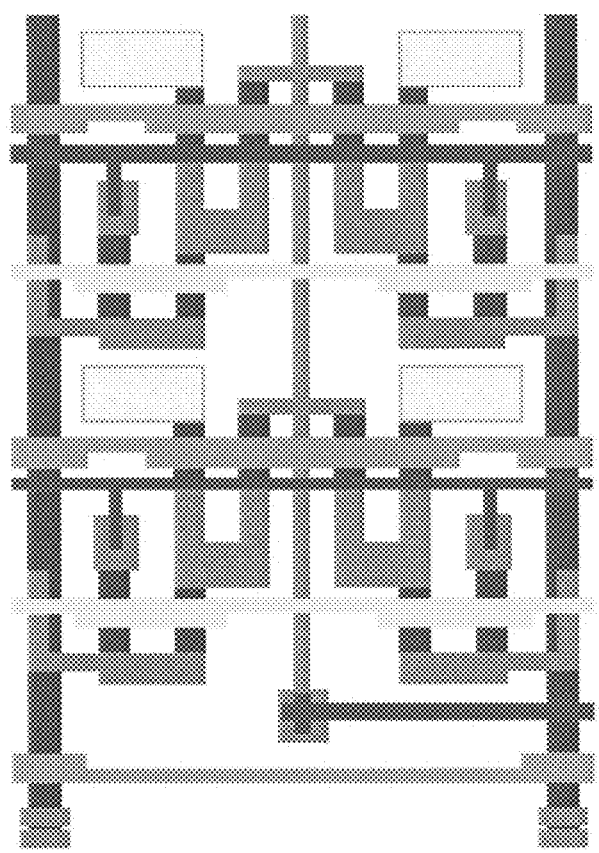

Step 5 is illustrated in FIG. 7E. Valve 3 is then closed and the mixture MNO in Portion 5 is incubated under reaction conditions.

Exemplary Reactions

It will be apparent to the reader that the present invention may be used in a wide variety of applications. The following examples are for illustration and not for limitation.

Proximity Ligation Assays

Assays using proximity ligation methodology can be conducted using a device of the invention. For example, solution M may contain antigen-specific antibody pairs labeled with proximity ligation probes; solution N may be samples containing antigens of interest; and solution O may be a ligation/PCR mixture for ligation and detection of product. See, Gullberg, et al., 2003, A sense of closeness: protein detection by proximity ligation, Curr. Opin. Biotech. 14:82-86.

Gene Fragment Expression Analysis

Gene fragment expression analysis may be carried out using the device of the invention. For example, solution M may contain 5' primer designed for polymerase incomplete primer extension (PIPE) cloning plus parent vector containing ORF of choice cloned in-frame with fluorescent protein enzyme for which fluorescent substrates are available (e.g. beta-galactosidase, HRP); solution N may contain 3' primers designed for PIPE cloning, along with PCR-cloning mix; and solution O may contain Dpnl (to digest parent vector), in-vitro transcription-translation mixture, and fluorescent substrate for enzyme if fluorescent protein is not used. 5' and 3' primers are designed to produce a series of nested deletion constructs from the parent vectors. Reaction 1, which occurs in the third portion after mixing of solutions M and N is the PIPE cloning reaction. Reaction 2 is an IVIT reaction. Any combination of 5' and 3' primers resulting in soluble expression of protein will produce fluorescence caused by the C-terminal fluorescent protein or linked enzyme.

Combinatorial Peptide Synthesis

Devices of the invention may be used for combinatorial syntheses, such as combinatorial peptide synthesis. For example, solution M may contain a variety of first protected Peptide Dimers; solution N may contain a variety of second protected Peptide Dimers; and solution O may contain a single third protected Peptide Dimer. In reaction 1, the dimers are deprotected (e.g., using UV light treatment) and polymerize to form a variety of tetramers. In reaction 2 the third peptide dimer is linked to each of the various tetramers.

Bacterial Pathogen Assay

Devices of the invention may be used for analysis of cells. For example solution M may contain bacterial cells, solution N may contain lysis buffer, and solution O may contain a detectably labeled antiligand that binds a pathogen-specific ligand.

Devices Configured for Additional Binary Reactions

Figure 8A:
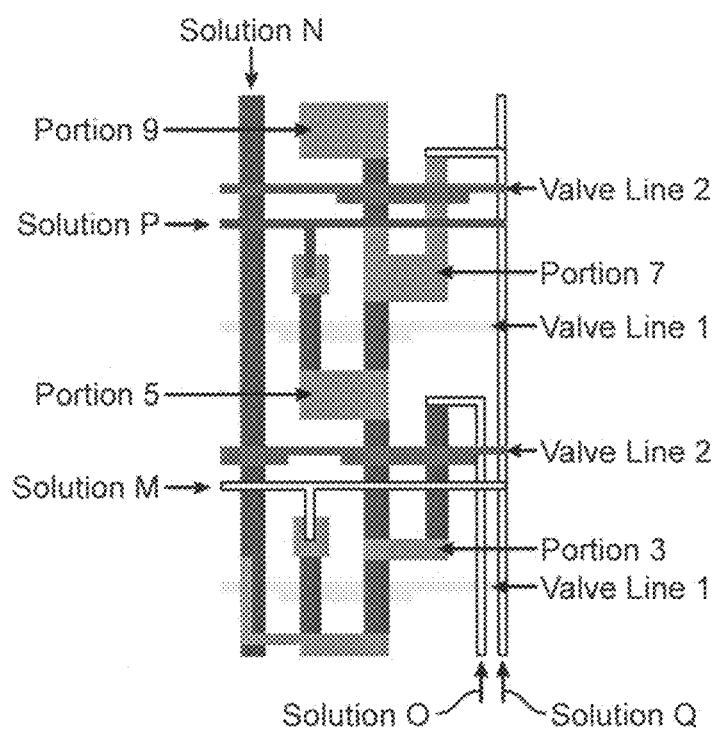
FIGS. 8A, 8B and 8C are color figure showing an alternative design in which portion 5 is fluidically contiguous with portions 6 and 7, and have positional relationships analogous to portions 2, 1, and 3, respectively, of FIG. 2.
Figure 8B:
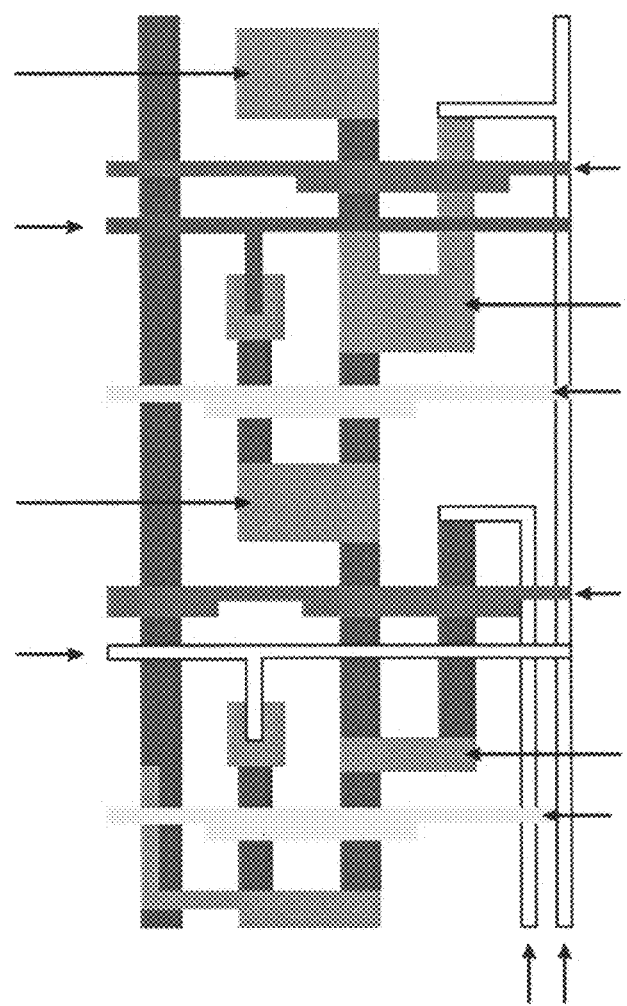

In an alternative design, illustrated in FIG. 8A-B, portion 5 may be fluidically linked (e.g., contiguous) with additional portions 6 and 7 with the basic structure of the unit cell duplicated. In this design portions 5, 6, 7, 8 and 9 have positional relationships and functions analogous to portions 2, 1, 3, 4 and 5, respectively. In FIG. 8 two control channels (or "valve lines") are labeled "valve line 1," indicating that both lines are commonly controlled (e.g., pressurized or depressurized in concert). In one embodiment the upper valve line 1 is continuous with the lower valve line 1. In one embodiment the upper and lower valve lines are linked to a common bus line (like tines on a fork). In one embodiment the upper and lower valve lines are part of a single serpentine channel. The two control channels labeled "valve line 2" are similarly coordinately controlled.

Figure 8C:
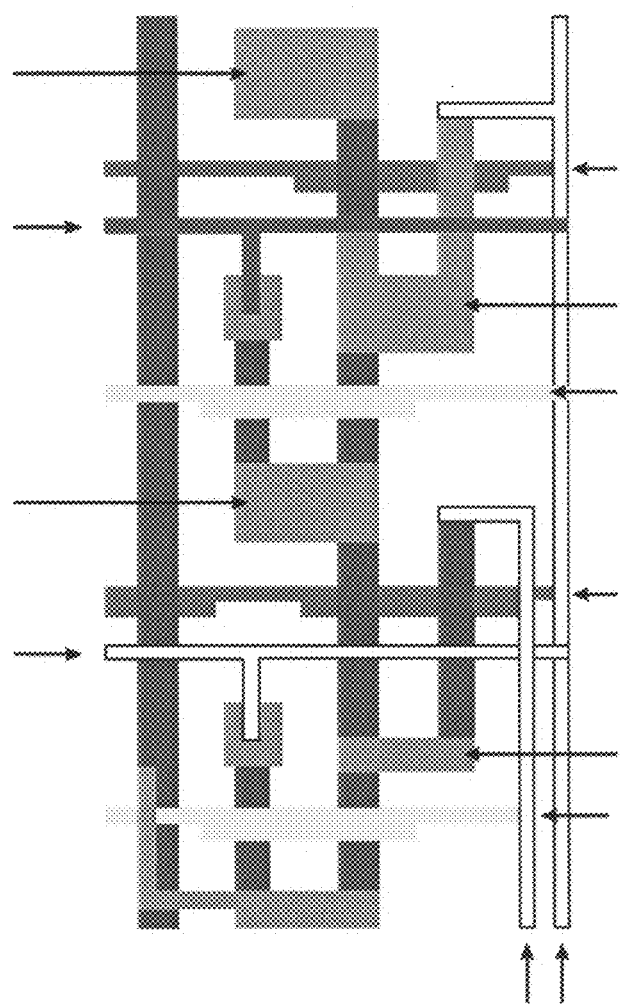

FIGS. 8A-C illustrate steps used to conduct 4 binary mixing reactions in a unit cell.

With reference to FIGS. 8A-C, the following steps can be carried out to complete 4 sequential binary mixing reactions.

Step 1: With valve line 1 closed and valve line 2 open (FIG. 8A) load Solutions N and M.

Step 2: With valve line 1 open, valve line 2 closed (FIG. 8B), push solution N into portion 3 with solution M.

Step 3: With valve line 1 closed and valve line 2 closed (FIG. 8C), incubate mixture MN (reaction 1) in portion 3.

Step 3A: Load solution O.

Step 4: With valve line 1 closed and valve line 2 open, push mixture MN (as transformed by reaction 1) into portion 5 with solution O.

Step 5: With valve line 1 closed and valve line 2 closed, incubate mixture MNO (reaction 2) in portion 5.

Step 5A: Load solution P.

Step 6: With valve line 1 open and valve line 2 closed, push mixture MNO (as transformed by reactions 1 and 2) into portion 7 with solution P.

Step 7: With valve line 1 closed and valve line 2 closed, incubate mixture MNOP (reaction 3) in portion 7.

Step 7A: Load solution Q.

Step 8: With valve line 1 closed an valve line 2 open, push mixture MNOP (reaction 3) into chamber 9 with solution Q.

Step 9: With valve line 1 closed and valve line 2 closed, incubate mixture MNOPQ (reaction 4) in portion 9.

It will be recognized that the device illustrated in FIG. 8 can be modified for carrying out only three (3) binary mixing reactions, by omitting portions 8 and 9, or can be modified to carry out more than four binary mixing reactions.

Harvesting

In one aspect the invention provides devices and methods that allow reaction products from several unit cells in an FCS array to be efficiently collected and pooled, or "harvested." In one embodiment, illustrated in FIGS. 9A-D, a binary reaction is carried out in each unit cell and the products of each reaction collected and pooled. The same harvesting process can be carried out in a device in which multiple binary reactions are carried out (e.g., as illustrated in FIG. 8).

The unit cells of the harvest embodiment are designed as described above (and in copending unpublished application Ser. No. 12/018,138) but comprises harvest bus lines linking unit cells and configured to allow harvest from multiple unit cells.

For illustration FIG. 9 shows an array of four unit cells, each of which has first and second control channels, first, second, third, fourth and fifth flow portions, a row bus line, a column bus line, and valves 1-4, using the naming conventions hereinabove.

In operation each unit cell is loaded with solutions M and N with valves 1 and 2 closed. With valves 3 and 4 closed valves 1 and 2 are opened and solution M in the first portion pushes solution N from the second portion into the third portion. The third portion has sufficient relative fluid capacity so that when filled is contains a mixture of solutions M and N (MN). Once the third portion is filled valve 2 is closed and valves 3 and 4 remain closed, isolating the mixture MN. The mixture is incubated under conditions in which a reaction occurs between components in solution M and components in solution N, resulting in a product (Prod). In general, the specific components carried in at least one of solution M and N will vary from unit cell to unit cell and accordingly, the products generated will differ from unit cell to unit cell.

As illustrated in FIG. 9, the products contained in each portion 3 in the plurality of unit cells in the array can be harvested. Harvest involves opening valves 3 and 4, and flowing a Harvest Reagent though the path defined by the third, fourth and fifth portions of each unit cell (in either direction), and from the terminal (third or fifth) portion via a harvest bus line to a different, usually adjacent, unit cell.

As illustrated in the figures, the Harvest Reagent is introduced into an initial unit cell via a Harvest Reagent input line and collected from a terminal unit cell via a Harvest Reagent output line. In one embodiment, the Harvest Reagent input line can be fludically connected to an external source of harvest reagent. The Harvest Reagent output line can be fludically linked to an outlet region on the device. For example, the outlet region may be a chamber or channel built into a microfluidic device, linking to additional microfluidic components for downstream on-chip processing. Alternatively, the outlet region could be a well in a frame in which the device is situated. Alternative, the outlet region may be a well built into the PDMS of a device (e.g., an integrated fluidic chip). Additionally, the outlet region could be a capillary or piece of tubing for storage or connection to a second device.

Harvest Reagent (also referred to as a "push fluid") may be an aqueous solution or a non-aqueous liquid (such as Krytox oil). Non-aqueous harvest reagents are expected to result in more quantitative recovery without the necessity is using large volumes of the Harvest Reagent.

Thus, the invention provides a device as described hereinabove having a first flow channel (Harvest Reagent bus line) that links the fourth portion of a unit cell with a fourth or fifth portion of a second unit cell and a second flow channel (Harvest Reagent bus line) that links the fifth portion of said unit cell with a fourth or fifth portion of a third unit cell. In general each unit cell is linked in this fashion to one or two unit adjacent cells. A unit cell is adjacent to a second unit cell if the distance from the first to second unit cells is less than or equal to the distance between the first unit cell and any other unit cell, distance being measured from the geometric center of the third portion of the unit cells.

As is apparent, the invention provides a method for transfer of a solution from one unit cell to another in an array. For example, in an array designed for a single binary reaction (e.g., as illustrated in FIG. 8) the invention provides a method for transferring a solution from the third portion of a first unit cell to a fourth or fifth portion of a different unit cell in a device according to claim 3, said method comprising:

with valve 2 closed and valves 3 and 4 open, flowing a push fluid through the flow path defined by the sequence
  i) fourth portion of the first unit cell
  ii) third portion of the first unit cell
  iii) fifth portion of the first unit cell
  iv) channel linking fifth portion of the first unit cell with the fourth or fifth portion of the second unit cell
  v) fourth or fifth portion of the second unit cell, wherein valve 2 of the second unit cell is closed,
whereby the push fluid displaces the solution from the third portion though the flow path to the fourth or fifth portion of the second unit cell.

In one embodiment the method further comprises
with valve 2 closed and valves 3 and 4 open, flowing the push fluid through the flow path defined by the sequence
  i) fourth portion of the second unit cell
  ii) third portion of the second unit cell
  iii) fifth portion of the second unit cell
  iv) channel linking fifth portion of the second unit cell with the fourth or fifth portion of a third unit cell
  or
  i) fifth portion of the second unit cell
  ii) third portion of the second unit cell
  iii) fourth portion of the second unit cell
  iv) channel linking fourth portion of the second unit cell with the fourth or fifth portion of a third unit cell.

The ability to harvest reaction products has many applications, including, for example, locus-specific amplification for DNA sequencing. In this application solution M contains pairs of forward and reverse primers for amplification of a specific genetic region; solution N contains samples containing template DNA. When solutions M and N are combined, amplification of the region specified by the primer pairs M occurs. In an array with X rows and Y columns, X reagents can be combined with Y samples to effect XY reactions. The reaction products are then harvested in series using a harvest reagent P.

Another features of this device architecture is that despite mixing sets of reagents, and enabling reaction product harvest, it requires only two control lines. During the sequence of control steps in the chip operating process, the role of the valves alternates between acting, as an interface valve (keeping reaction components separate) and as a containment-valve (encapsulating a reaction volume).

Example

FIGS. 9A-9D illustrate a binary reaction carried out simultaneously in four unit cells, and the harvest of the product.

Figure 9A:
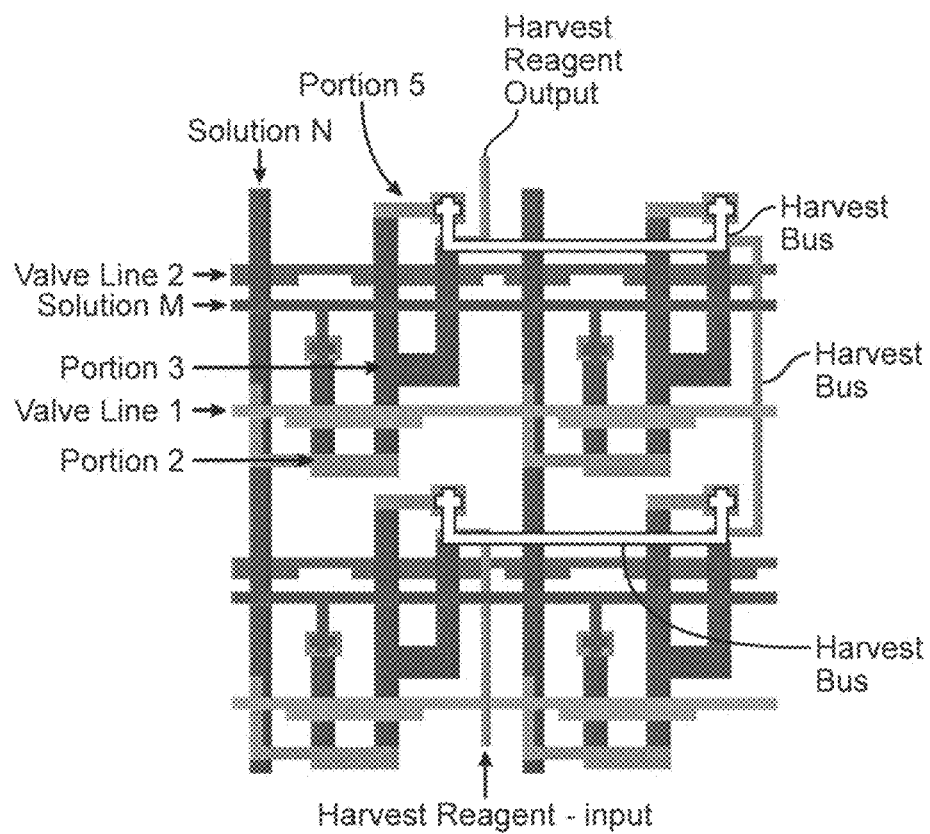
FIGS. 9A, 9B, 9C and 9D are color figure showing a binary reaction carried out in each unit cell and the products of each reaction collected and pooled.

FIG. 9A
  Step 1: Close Valve line 1, Open Valve line 2.
  Step 2: Fill the second portion with solution M, load solution N in portion 1 against Valve line 1

Figure 9B:
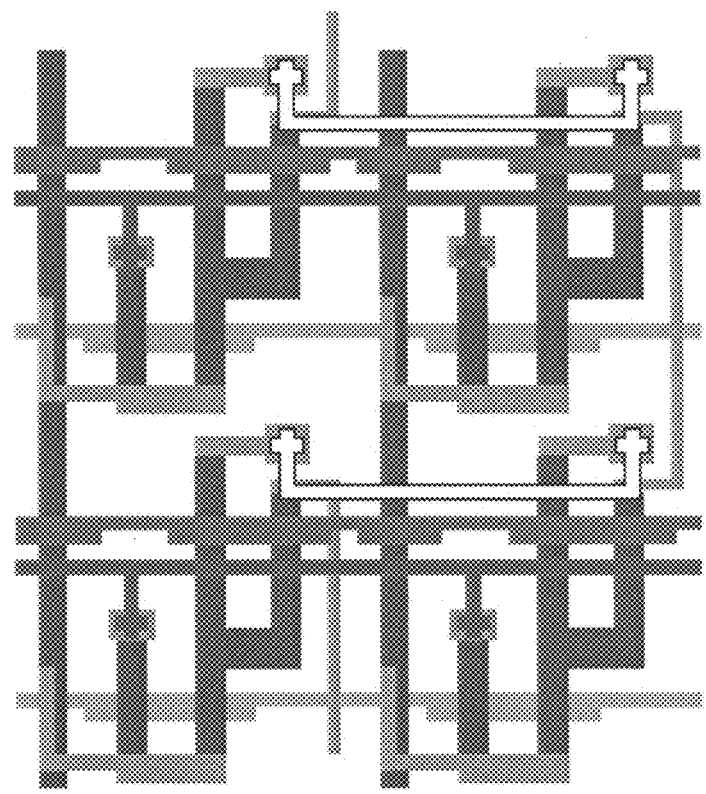

FIG. 9B
  Step 3 Open Valve line I, Close valve line 2.
  Step 4: Displace solution N into the third portion by pressurizing with solution M.

Figure 9C:
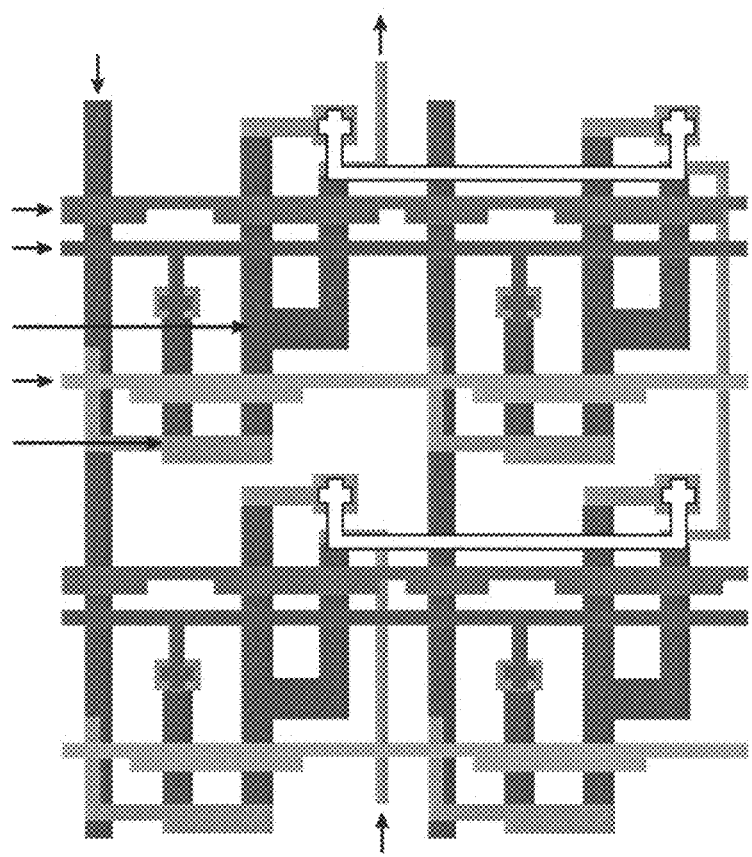

FIG. 9C
  Step 5: Close valve line 1, Close valve line 2
  Step 6: Incubate/Carry out reaction 1 in portion 3

Figure 9D:
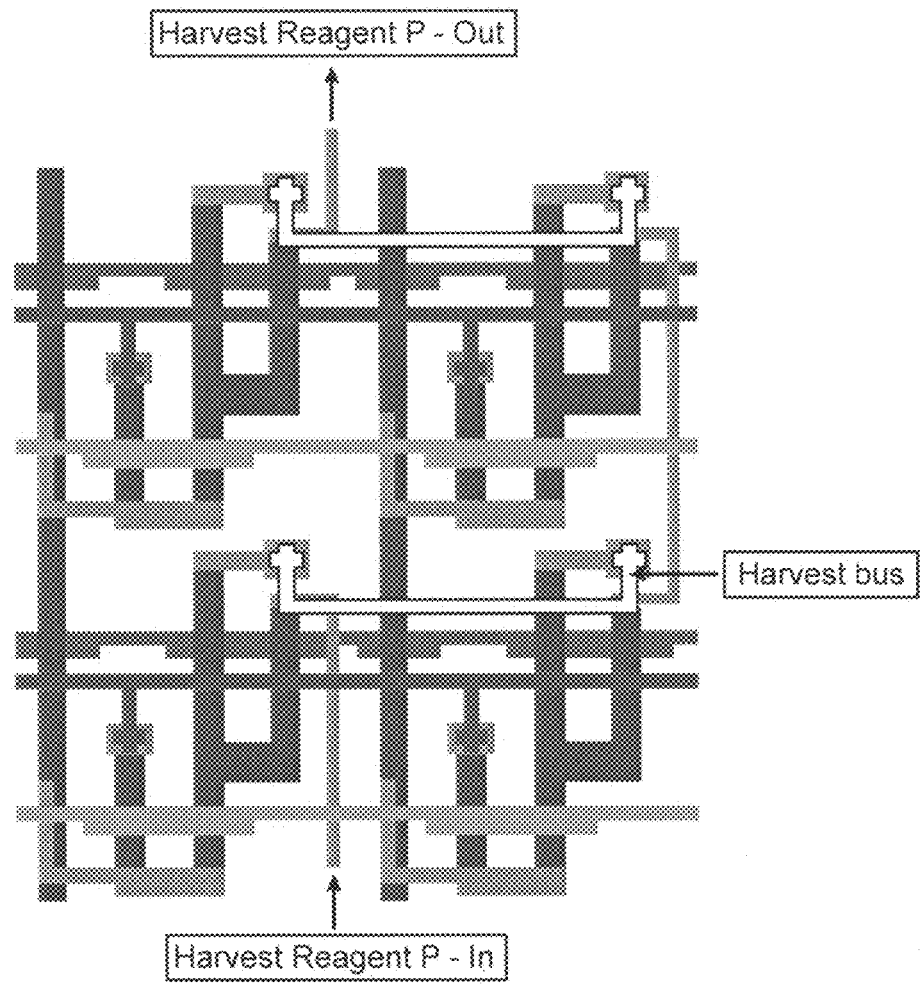

FIG. 9D
  Step 7: Load Harvest Reagent against valve line 2
  Step 8: Close Valve line 1, Open Valve line 2
  Step 9: Pressurize Harvest Reagent P. P will travel in series through all reaction chambers before exiting through the harvest reagent outlet.

As shown in FIG. 9D, one important feature of the invention is that the harvest architecture is independent of the fluid architecture required for loading initial reagents into the chip, and requires no additional control lines. The harvest architecture can be designed so that all reactions are harvested in series.

Multiples

The design concept laid out in this disclosure is not limited to reactions that only require combinations of two sets of reagents. The architecture is extensible and enables multiple reaction steps to be conducted ahead of harvest.

Figure 10:
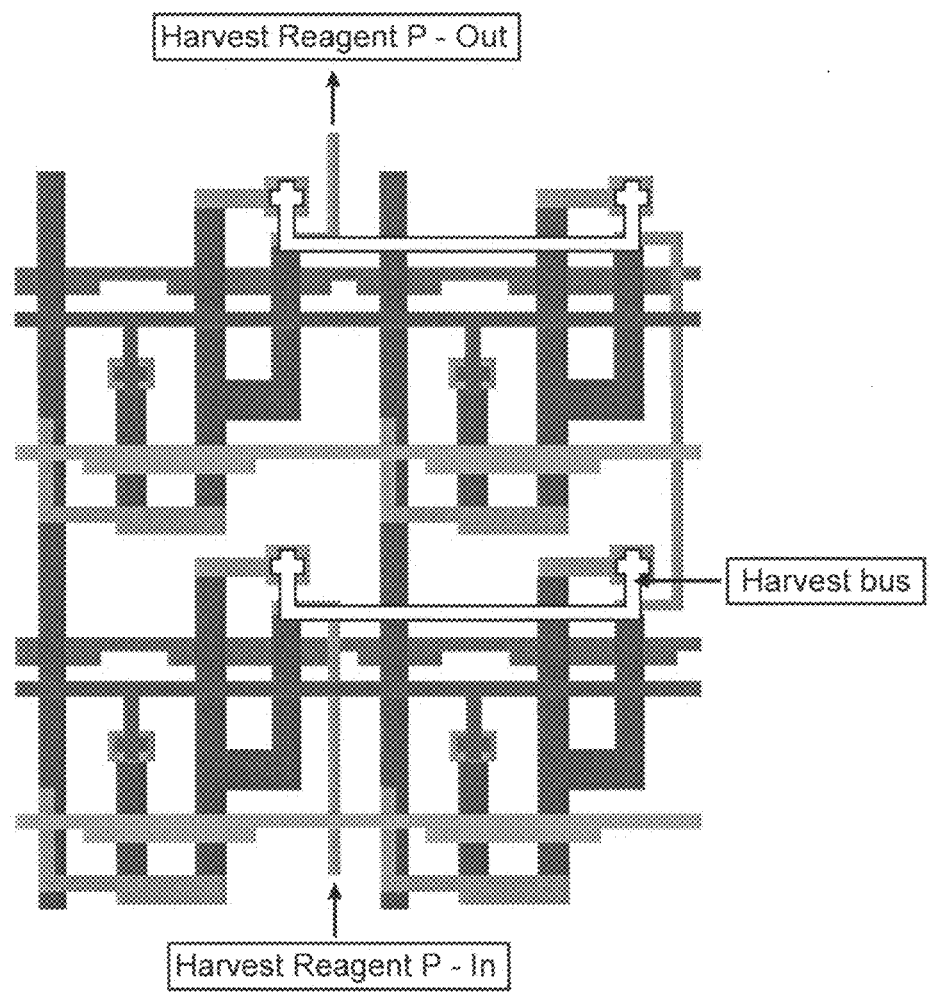
FIG. 10 shows that the harvest architecture is independent of the fluid architecture required for loading initial reagents into the chip, and requires no additional control lines.

Thus, although the harvest embodiment has been described by reference to portions 3, 4 and 5 it will be recognized that in devices with unit cells designed for multiple binary reactions, the path of the Harvest Reagent will be through the terminal (final) portion in which binary mixing takes place. Thus, with reference to FIG. 10 in which binary mixing reactions occur in portions 3, 5, and 7 harvest reagent flows from a Harvest Reagent bus line into portion 7, from portion 7 into portion 9, and via a Harvest Reagent bus line to an adjacent unit cell.

Accordingly, an embodiment in which the terminal binary mixing reaction occurs in portion 5 is described by substituting, in the text above beginning with the caption "Harvesting" by substituting references to fourth, third, and fifth portions with sixth, fifth and seventh portions respectively, and an embodiment in which the terminal binary mixing reaction occurs in portion 7 is described by substituting, in the text above beginning with the caption "Harvesting" by substituting references to fourth, third, and fifth portions with eight, seventh and ninth portions respectively.

Note that flow portions in direct fluid communication with a Harvest Reagent bus line may be small or eliminated. For example, a Harvest Reagent bus line into a unit cell may feed directly into, or draw directly from, the terminal portion in which binary mixing occurs (e.g., portion 3, 5, or 7).

Double-U Architecture

In one aspect the invention provides a microfluidic device comprising a plurality of unit cells, each cell in said plurality comprising a region with a double-U architecture.

Figure 11:
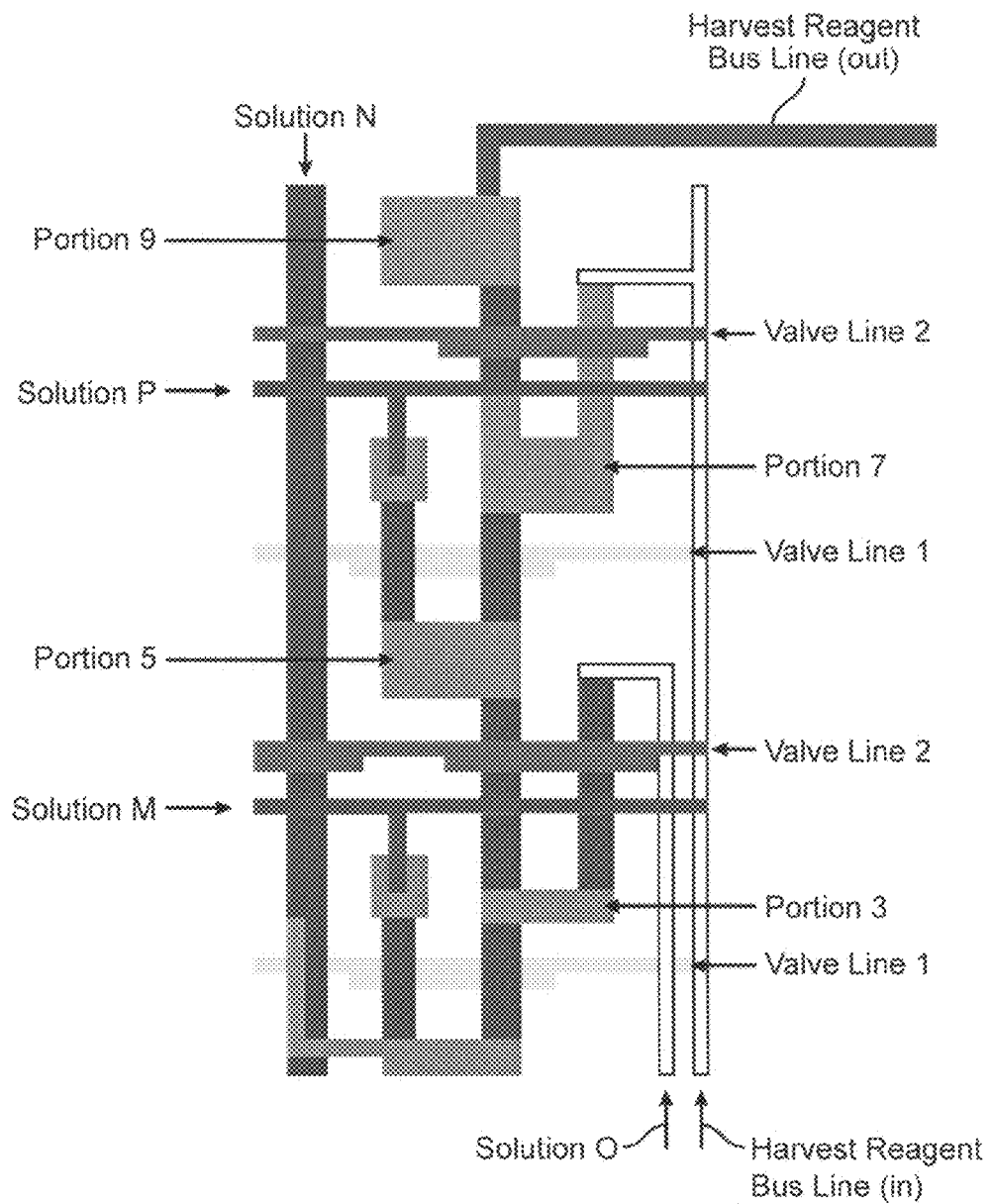
FIG. 11 illustrates that in devices with unit cells designed for multiple binary reactions, the path of the Harvest Reagent will be through the terminal (final) portion in which binary mixing takes place.
Figure 12A:
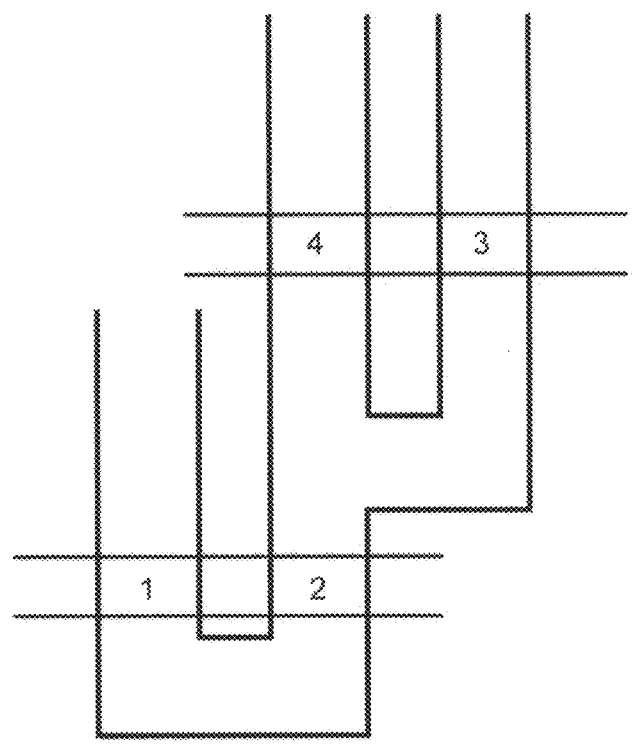
FIGS. 12A and 12B illustrate the double-U architecture used in some embodiments of the invention.
Figure 12B:
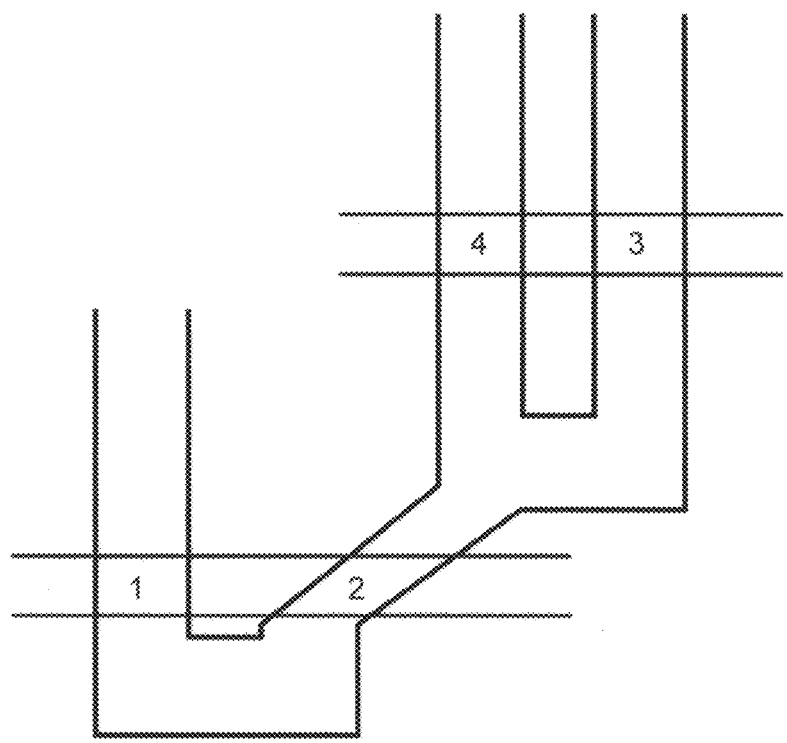

FIG. 11A illustrates the double-U architecture used in some embodiments of the invention. The double-U architecture comprises a) Two U-shaped flow passage networks, each having a right arm, and left arm and a base arm. In some embodiments the arms meet at right angles (as illustrated in FIG. 11A). In some embodiments the U-shaped channels do not meet at right angles, but have a curved shape (e.g., U). The two U-shaped flow passage networks are in fluidic communication. The U-shaped flow passage networks can be referred to as the upper U-shaped flow passage network and the lower U-shaped flow passage network.

b) Two control channels:
  i) A first control channel that traverses (e.g., is orthogonal to) two arms of the lower U-shaped flow passage network but neither arm of the upper U-shaped flow passage network and neither base arm; and which controls a single valve in each of said two arms;
  ii) A second control channel that traverses (e.g., is orthogonal to) two arms of the upper U-shaped flow passage network but neither arm of the lower U-shaped flow passage network and neither base arm; and which controls a single valve in each of said two arms.

In a preferred embodiment the left arm and right arm of one or both U-shaped flow passage networks are substantially parallel to each other. In a preferred embodiment exactly one arm of the lower U-shaped flow passage network is continuous and aligned with exactly one arm of the upper U-shaped flow passage network, as illustrated in FIG. 11A.

An alternative embodiment is shown in FIG. 11B.

In some embodiments one of more arms comprises a microfluidic chamber.

Methodology

As used herein, the terms "layer" and "level" have the standard meaning in the art. The terms are used interchangeably when referring to the position of flow channel segments, control channels, reaction chambers and other elements of a microfluidic device. In some microfluidic devices channels are located in different planes of the device. For example, an on/off elastomeric valve can be fabricated by locating a control channel in one plane so that it crosses the path of a flow channel in an adjacent different plane. The term "layer" also reflects the method of fabrication of such devices, in which layers of elastomeric structures may be bonded to each other.

As used herein, a "flow path" describes a channel segment or series of channel segments through which a solution can flow and, more specifically, through which solution flows during the operation of a device.

The term "blind filling" refers to the process of instilling a solution into a channel or chamber that does not have a functional exit through which an aqueous solution can flow. A chamber or channel may have no functional exit because all potential exit flow channels are blocked by closed or impassable valves, or because there are no exit flow channels (e.g., no channels contiguous with the chamber other then the flow channel though which solution enters the chamber). In the latter situation, a reaction chamber into which the solution is instilled can be called a "dead-end" reaction chamber. A flow channel, or flow channel segment, into which solution is being instilled can be called a "dead-end" or "blind" channel. Blind filling takes advantage of the permeability of the material (e.g., elastomeric materials) defining at least a portion (e.g., at least a portion of one side) of the flow channel or at least a portion (e.g., at least a portion of one wall) of a chamber to gas and not to liquid.

An FCS device of the invention usually has at least 16 cells arrayed in at least four rows and at least four columns of cells.

Preferably an FCS device comprises more than 16 cells. For example FCS devices have been designed having a 12×8 (96 cells), 12×32 (384), 32×32 array (1024 cells), 48×48 (2304 cells), 96×48 (4608 cells) and a 96×96 array (9216 cells). In certain embodiments an FCS device may have at least 50 cells, at least 100, at least 500, at least 1000 cells, at least 2000 cells, at least 3000 cells, at least 4000 cells, at least 7500 cells, at least 9000 cells or an even greater number of cells. In one embodiment the cells are contained in a 30 mm×30 mm (900 mm$^2$) area of the nanofluidic chip. In one embodiment the cells are contained in an approximately 31 mm×31 mm area of the nanofluidic chip. In various embodiments the density of cells is at least 1 per mm$^2$, at least 2 per mm$^2$, at least 3 per mm$^2$, at least 4 per mm$^2$, at least 5 per mm$^2$, at least 6 per mm$^2$, at least 7 per mm$^2$, at least 8 per mm$^2$, at least 9 per mm$^2$, at least 10 per mm$^2$, or more than 10 cells per mm$^2$. In various embodiments the density of cells is from 1-20 cells per mm$^2$, or 1-11 cells per mm$^2$.

Characteristics and Fabrication of FCS Devices

FCS devices of the invention can be constructed out of any material or combination of materials that can be fabricated to have microfluidic channels and chambers, and valves that regulate flow through channels and into chambers. Materials from which a device can be fabricated include, without limitation, elastomers, silicon, glass, metal, polymer, ceramic, inorganic materials, and/or combinations of these materials.

The methods used in fabrication of a FCS device will vary with the materials used, and include soft lithography methods, microassembly, bulk micromachining methods, surface micro-machining methods, standard lithographic methods, wet etching, reactive ion etching, plasma etching, stereolithography and laser chemical three-dimensional writing methods, modular assembly methods, replica molding methods, injection molding methods, hot molding methods, laser ablation methods, combinations of methods, and other methods known in the art or developed in the future. A variety of exemplary fabrication methods are described in Fiorini and Chiu, 2005, "Disposable microfluidic devices: fabrication, function, and application" *Biotechniques* 38:429-46; Beebe et al., 2000, "Microfluidic tectonics: a comprehensive construction platform for microfluidic systems." *Proc. Natl. Acad. Sci. USA* 97:13488-13493; Rossier et al., 2002, "Plasma etched polymer microelectrochemical systems" *Lab Chip* 2:145-150; Becker et al., 2002, "Polymer microfluidic devices" *Talanta* 56:267-287; Becker et al., 2000, "Polymer microfabrication methods for microfluidic analytical applications" *Electrophoresis* 21:12-26; U.S. Pat. No. 6,767,706 B2, e.g., Section 6.8 "Microfabrication of a Silicon Device"; Terry et al., 1979, A Gas Chromatography Air Analyzer Fabricated on a Silicon Wafer, *IEEE Trans. on Electron Devices, v. ED-26*, pp. 1880-1886; Berg et al., 1994, *Micro Total Analysis Systems*, New York, Kluwer; Webster et al., 1996, *Monolithic Capillary Gel Electrophoresis Stage with On-Chip Detector* in International Conference On Micro Electromechanical Systems, MEMS 96, pp. 491496; and Mastrangelo et al., 1989, *Vacuum-Sealed Silicon Micromachined Incandescent Light Source*, in Intl. Electron Devices Meeting, IDEM 89, pp. 503-506.

A) Elastomeric Fabrication

In preferred embodiments, the device is fabricated using elastomeric materials. Fabrication methods using elastomeric materials and methods for design of devices and their components have been described in detail in the scientific and patent literature. See, e.g., Unger et al., 2000, *Science* 288: 113-16; U.S. Pat. No. 6,960,437 (Nucleic acid amplification utilizing microfluidic devices); U.S. Pat. No. 6,899,137 (Microfabricated elastomeric valve and pump systems); U.S. Pat. No. 6,767,706 (Integrated active flux microfluidic devices and methods); U.S. Pat. No. 6,752,922 (Microfluidic chromatography); U.S. Pat. No. 6,408,878 (Microfabricated elastomeric valve and pump systems); U.S. Pat. No. 6,645,432 (Microfluidic systems including three-dimensionally arrayed channel networks); U.S. Patent Application publication Nos. 2004/0115838, 20050072946; 20050000900; 20020127736; 20020109114; 20040115838; 20030138829; 20020164816; 20020127736; and 20020109114; PCT patent publications WO 2005/084191; WO05030822A2; and WO 01/01025; Quake & Scherer, 2000, "From micro to nanofabrication with soft materials" Science 290: 1536-40; Xia et al., 1998, "Soft lithography" Angewandte Chemie-International Edition 37:551-575; Unger et al., 2000, "Monolithic microfabricated valves and pumps by multilayer soft lithography" *Science* 288:113-116; Thorsen et al., 2002, "Microfluidic large-scale integration" *Science* 298:580-584; Chou et al., 2000, "Microfabricated Rotary Pump" Biomedical Microdevices 3:323-330; Liu et al., 2003, "Solving the "world-to-chip" interface problem with a microfluidic matrix" *Analytical Chemistry* 75, 4718-23," Hong et al, 2004, "A nanoliter-scale nucleic acid processor with parallel architecture" *Nature Biotechnology* 22:435-39; Fiorini and Chiu, 2005, "Disposable microfluidic devices: fabrication, function, and application" *Biotechniques* 38:429-46; Beebe et al., 2000, "Microfluidic tectonics: a comprehensive construction platform for microfluidic systems." *Proc. Natl. Acad. Sci. USA* 97:13488-13493; Rolland et al., 2004, "Solvent-resistant photocurable "liquid Teflon" for microfluidic device fabrication" *J. Amer. Chem. Soc.* 126:2322-2323; Rossier et al., 2002, "Plasma etched polymer microelectrochemical systems" *Lab Chip* 2:145-150; Becker et al., 2002, "Polymer microfluidic devices" *Talanta* 56:267-287; Becker et al., 2000, and other references cited herein and found in the scientific and patent literature.

i. Layer and Channel Dimensions

Microfabricated refers to the size of features of an elastomeric structure fabricated in accordance with an embodiment of the present invention. In general, variation in at least one dimension of microfabricated structures is controlled to the micron level, with at least one dimension being microscopic (i.e. below 1000 µm). Microfabrication typically involves semiconductor or MEMS fabrication techniques such as photolithography and spincoating that are designed for to produce feature dimensions on the microscopic level, with at least some of the dimension of the microfabricated structure requiring a microscope to reasonably resolve/image the structure.

In preferred aspects, flow channels preferably have width-to-depth ratios of about 10:1. A non-exclusive list of other ranges of width-to-depth ratios in accordance with embodiments of the present invention is 0.1:1 to 100:1, more preferably 1:1 to 50:1, more preferably 2:1 to 20:1, and most preferably 3:1 to 15:1. In an exemplary aspect, flow channels have widths of about 1 to 1000 microns. A non-exclusive list of other ranges of widths of flow channels in accordance with embodiments of the present invention is 0.01 to 1000 microns, more preferably 0.05 to 1000 microns, more preferably 0.2 to 500 microns, more preferably 1 to 250 microns, and most preferably 10 to 200 microns. Exemplary channel widths include 0.1 µm, 1 µm, 2 µm, 5 µm, 10 µm, 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 210 µm, 220 µm, 230 µm, 240 µm, and 250 µm.

Flow channels have depths of about 1 to 100 microns. A non-exclusive list of other ranges of depths of flow channels in accordance with embodiments of the present invention is 0.01 to 1000 microns, more preferably 0.05 to 500 microns, more preferably 0.2 to 250 microns, and more preferably 1 to 100 microns, more preferably 2 to 20 microns, and most preferably 5 to 10 microns. Exemplary channel depths include including 0.01 µm, 0.02 µm, 0.05 µm, 0.1 µm, 0.2 µm, 0.5 µm, 1 µm, 2 µm, 3 µm, 4 µm, 5 µm, 7.5 µm, 10 µm, 12.5 µm, 15 µm, 17.5 µm, 20 µm, 22.5 µm, 25 µm, 30 µm, 40 µm, 50 µm, 75 µm, 100 µm, 150 µm, 200 µm, and 250 µm.

Elastomeric layers may be cast thick for mechanical stability. In an exemplary embodiment, a layer is 50 microns to over a centimeter thick, and more preferably approximately 4 mm thick. A non-exclusive list of ranges of thickness of the elastomer layer in accordance with other embodiments of the present invention is between about 0.1 micron to 1 cm, 1 micron to 1 cm, 10 microns to 0.5 cm, 100 microns to 10 mm.

Accordingly, membranes separating flow channels have a typical thickness of between about 0.01 and 1000 microns, more preferably 0.05 to 500 microns, more preferably 0.2 to 250, more preferably 1 to 100 microns, more preferably 2 to 50 microns, and more preferably 5 to 40 microns, and most preferably 10-25 µm. Exemplary membrane thicknesses include 0.01 µm, 0.02 µm, 0.03 µm, 0.05 µm, 0.1 µm, 0.2 µm, 0.3 µm, 0.5 µm, 1 µm, 2 µm, 3 µm, 5 µm, 7.5 µm, 10 µm, 12.5 µm, 15 µm, 17.5 µm, 20 µm, 22.5 µm, 25 µm, 30 µm, 40 µm, 50 µm, 75 µm, 100 µm, 150 µm, 200 µm, 250 µm, 300 µm, 400 µm, 500 µm, 750 µm, and 1000 µm.

ii. Reaction Chambers

Reaction chamber dimensions in an FCS device can vary over a broad range. In embodiments of the present invention, reaction volumes ranging from 10 picoliters to 100 nanoliters are utilized. In some embodiments, reaction volumes greater than 100 nanoliters are utilized. Reaction chambers may also be in the microliter, nanoliter, picoliter, femtoliter or lower range of volume. In one embodiment, the reaction chamber volume is between 1-1000 femtoliters. Merely by way of example, in an embodiment, the methods and systems of the present invention are utilized with reaction volumes of 10 picoliters, 50 picoliters, 100 picoliters, 250 picoliters, 500 picoliters, and 1 nanoliter. In alternative embodiments, reaction volumes of 2 nanoliters, 5 nanoliters, 10 nanoliters, 20 nanoliters, 30 nanoliters, 40 nanoliters, 50 nanoliters, 75 nanoliters, and 100 nanoliters are utilized. In another embodiment, the reaction chamber volume is between 1-1000 picoliters. In another embodiment, the reaction chamber volume is between 0.01-100 nanoliters, preferably between 1-75 nanoliters. In one embodiment the reaction chamber volume is about 50 nanoliters. In one embodiment the reaction chamber volume is about 7.6 nanoliters. In another embodiment, the reaction chamber volume is 6 nL. The volume defined for the first solution in the flow channel (the slug volume or carry-on volume) is a fraction of the reaction chamber volume. In various embodiments, the fraction may be ⅞, ¾, ⅝, ½, ⅜, ¼, ⅕, ⅛, 1/10, 1/12, 1/20, 1/25, 1/50, 1/100, or less of the total reaction chamber volume. Preferably the fraction is less than ½, more preferably less than ¼, more preferably less than ⅛. In some embodiments the volume of reagent solution is about 1/10th the volume of the reaction chamber and the volume of the sample solution is about 9/10th of the volume of the reaction chamber.

Reaction chambers are often cuboid due in part to relative ease of manufacture, however other shapes can be used. In preferred embodiments the chamber comprises internal edges (i.e., is not spherical). These edges enhance mixing of reagent and sample. A cuboid chamber has 12 internal edges. In one embodiment the reagent chamber has at least 2 internal edges (e.g., a cylinder). More often the chamber has at least 10, at least 12, at least 14, at least 16, or at least 20 internal edges.

Elastomeric Valves

As discussed above, in preferred embodiments the FCS device comprises elastomeric materials and monolithic valves, such as a pressure-actuated "elastomeric valve." A pressure-actuated elastomeric valve consists of a configuration in which two microchannels are separated by an elastomeric segment that can be deflected into or retracted from one of the channels (e.g., a flow channel) in response to an actuation force applied to the other channel (e.g., a control channel). Examples of elastomeric valves include upwardly-deflecting valves (see, e.g., US 20050072946), downwardly deflecting valves (see, e.g., U.S. Pat. No. 6,408,878), side actuated valves (see, e.g., US 20020127736, e.g., paragraphs 0215-0219), normally-closed valves (see, e.g., U.S. Pat. No. 6,408,878 B2 and U.S. Pat. No. 6,899,137) and others. In some embodiments a device can have a combination of valves (e.g., upwardly deflecting valves and downwardly deflecting valves). Valves can be actuated by injecting gases (e.g., air, nitrogen, and argon), liquids (e.g., water, silicon oils, perfluoropolyalkylether, and other oils), solutions containing salts and/or polymers (including but not limited to polyethylene glycol, glycerol and carbohydrates) and the like into the control channel. Some valves can be actuated by applying a vacuum to the control channel.

Multilayer Soft Lithography Construction Techniques and Materials

The microfluidic devices disclosed herein are typically constructed at least in part from elastomeric materials and constructed by single and multilayer soft lithography (MSL) techniques and/or sacrificial-layer encapsulation methods (see, e.g., Unger et al., 2000, *Science* 288:113-116, and PCT Publication WO 01/01025, both of which are incorporated by reference herein in their entirety for all purposes). Utilizing such methods, microfluidic devices can be designed in which solution flow through flow channels of the device is controlled, at least in part, with one or more control channels that are separated from the flow channel by an elastomeric membrane or segment. This membrane or segment can be deflected into or retracted from the flow channel with which a control channel is associated by applying an actuation force to the control channels. By controlling the degree to which the membrane is deflected into or retracted out from the flow channel, solution flow can be slowed or entirely blocked through the flow channel. Using combinations of control and flow channels of this type, one can prepare a variety of different types of valves and pumps for regulating solution flow as described in extensive detail in Unger et al., 2000, *Science* 288:113-116, PCT Publications WO/02/43615 and WO 01/01025, and other references cited herein and known in the art.

Soft Lithographic Bonding:

Preferably, elastomeric layers are bonded together chemically, using chemistry that is intrinsic to the polymers comprising the patterned elastomer layers. Most preferably, the bonding comprises two component "addition cure" bonding.

In one aspect, the various layers of elastomer are bound together in a heterogenous bonding in which the layers have a different chemistry. Alternatively, a homogenous bonding may be used in which all layers would be of the same chemistry. Thirdly, the respective elastomer layers may optionally be glued together by an adhesive instead. In a fourth aspect, the elastomeric layers may be thermoset elastomers bonded together by heating.

In one aspect of homogeneous bonding, the elastomeric layers are composed of the same elastomer material, with the same chemical entity in one layer reacting with the same chemical entity in the other layer to bond the layers together. In one embodiment, bonding between polymer chains of like elastomer layers may result from activation of a crosslinking agent due to light, heat, or chemical reaction with a separate chemical species.

Alternatively in a heterogeneous aspect, the elastomeric layers are composed of different elastomeric materials, with a first chemical entity in one layer reacting with a second chemical entity in another layer. In one exemplary heterogenous aspect, the bonding process used to bind respective elastomeric layers together may comprise bonding together two layers of RTV 615 silicone. RTV 615 silicone is a two-part addition-cure silicone rubber. Part A contains vinyl groups and catalyst; part B contains silicon hydride (Si—H) groups. The conventional ratio for RTV 615 is 10A:1B. For bonding, one layer may be made with 30A:1B (i.e. excess vinyl groups) and the other with 3A:1B (i.e. excess Si—H groups). Each layer is cured separately. When the two layers are brought into contact and heated at elevated temperature, they bond irreversibly forming a monolithic elastomeric substrate.

Alternatively, other bonding methods may be used, including activating the elastomer surface, for example by plasma exposure, so that the elastomer layers/substrate will bond when placed in contact. For example, one possible approach to bonding together elastomer layers composed of the same material is set forth by Duffy et al, "Rapid Prototyping of Microfluidic Systems in Poly (dimethylsiloxane)", *Analytical Chemistry* (1998), 70, 4974-4984, incorporated herein by reference. This paper discusses that exposing polydimethylsiloxane (PDMS) layers to oxygen plasma causes oxidation of the surface, with irreversible bonding occurring when the two oxidized layers are placed into contact.

Yet another approach to bonding together successive layers of elastomer is to utilize the adhesive properties of uncured elastomer. Specifically, a thin layer of uncured elastomer such as RTV 615 is applied on top of a first cured elastomeric layer. Next, a second cured elastomeric layer is placed on top of the uncured elastomeric layer. The thin middle layer of uncured elastomer is then cured to produce a monolithic elastomeric structure. Alternatively, uncured elastomer can be applied to the bottom of a first cured elastomer layer, with the first cured elastomer layer placed on top of a second cured elastomer layer. Curing the middle thin elastomer layer again results in formation of a monolithic elastomeric structure.

Elastomeric layers may be created by spin-coating an RTV mixture on microfabricated mold at 2000 rpm for 30 seconds yielding a thickness of approximately 40 microns. Additional elastomeric layers may be created by spin-coating an RTV mixture on microfabricated mold. Both layers may be separately baked or cured at about 80° C. for 1.5 hours. The additional elastomeric layer may be bonded onto first elastomeric layer at about 80° C. for about 1.5 hours.

Suitable Elastomeric Materials:

Allcock et al, Contemporary Polymer Chemistry, 2nd Ed. describes elastomers in general as polymers existing at a temperature between their glass transition temperature and liquefaction temperature. Elastomeric materials exhibit elastic properties because the polymer chains readily undergo torsional motion to permit uncoiling of the backbone chains in response to a force, with the backbone chains recoiling to assume the prior shape in the absence of the force. In general, elastomers deform when force is applied, but then return to their original shape when the force is removed. The elasticity exhibited by elastomeric materials may be characterized by a Young's modulus.

The systems of the present invention may be fabricated from a wide variety of elastomers. In an exemplary aspect, elastomeric layers may preferably be fabricated from silicone rubber. However, other suitable elastomers may also be used.

In an exemplary aspect of the present invention, the present systems are fabricated from an elastomeric polymer such as GE RTV 615 (formulation), a vinyl-silane crosslinked (type) silicone elastomer (family). However, the present systems are not limited to this one formulation, type or even this family of polymer; rather, nearly any elastomeric polymer is suitable. An important requirement for the preferred method of fabrication of the present microvalves is the ability to bond multiple layers of elastomers together. In the case of multilayer soft lithography, layers of elastomer are cured separately and then bonded together. This scheme requires that cured layers possess sufficient reactivity to bond together. Either the layers may be of the same type, and are capable of bonding to themselves, or they may be of two different types, and are capable of bonding to each other. Other possibilities include the use an adhesive between layers and the use of thermoset elastomers.

Given the tremendous diversity of polymer chemistries, precursors, synthetic methods, reaction conditions, and potential additives, there are a huge number of possible elastomer systems that could be used to make monolithic elastomeric microvalves and pumps. Variations in the materials used will most likely be driven by the need for particular material properties, i.e. solvent resistance, stiffness, gas permeability, or temperature stability.

There are many, many types of elastomeric polymers. A brief description of the most common classes of elastomers is presented here, with the intent of showing that even with relatively "standard" polymers, many possibilities for bonding exist. Common elastomeric polymers include polyisoprene, polybutadiene, polychloroprene, polyisobutylene, poly(styrene-butadiene-styrene), the polyurethanes, and silicones. A non-exclusive list of elastomeric materials which may be utilized in connection with the present invention includes polyisoprene, polybutadiene, polychloroprene, polyisobutylene, poly(styrene-butadiene-styrene), the polyurethanes, and silicone polymers; or poly(bis(fluoroalkoxy) phosphazene) (PNF, Eypel-F), perfluoropolyalkylether siloxane block copolymer, poly(carborane-siloxanes) (Dexsil), poly(acrylonitrile-butadiene) (nitrile rubber), poly(1-butene), poly(chlorotrifluoroethylene-vinylidene fluoride) copolymers (Kel-F), poly(ethyl vinyl ether), poly(vinylidene fluoride), poly(vinylidene fluoride-hexafluoropropylene) copolymer (Viton), elastomeric compositions of polyvinylchloride (PVC), polysulfone, polycarbonate, polymethylmethacrylate (PMMA), and polytertrafluoro-ethylene (Teflon).

a. Polyisoprene, polybutadiene, polychloroprene:

Polyisoprene, polybutadiene, and polychloroprene are all polymerized from diene monomers, and therefore have one double bond per monomer when polymerized. This double bond allows the polymers to be converted to elastomers by vulcanization (essentially, sulfur is used to form crosslinks between the double bonds by heating). This would easily allow homogeneous multilayer soft lithography by incomplete vulcanization of the layers to be bonded; photoresist encapsulation would be possible by a similar mechanism.

b. Polyisobutylene:

Pure polyisobutylene has no double bonds, but is crosslinked to use as an elastomer by including a small amount (≈1%) of isoprene in the polymerization. The isoprene monomers give pendant double bonds on the polyisobutylene backbone, which may then be vulcanized as above.

c. Poly(styrene-butadiene-styrene):

Poly(styrene-butadiene-styrene) is produced by living anionic polymerization (that is, there is no natural chain-terminating step in the reaction), so "live" polymer ends can exist in the cured polymer. This makes it a natural candidate for the present photoresist encapsulation system (where there will be plenty of unreacted monomer in the liquid layer poured on top of the cured layer). Incomplete curing would allow homogeneous multilayer soft lithography (A to A bonding). The chemistry also facilitates making one layer with extra butadiene ("A") and coupling agent and the other layer ("B") with a butadiene deficit (for heterogeneous multilayer soft lithography). SBS is a "thermoset elastomer", meaning that above a certain temperature it melts and becomes plastic (as opposed to elastic); reducing the temperature yields the elastomer again. Thus, layers can be bonded together by heating.

d. Polyurethanes:

Polyurethanes are produced from di-isocyanates (A-A) and di-alcohols or di-amines (B-B); since there are a large variety of di-isocyanates and di-alcohols/amines, the number of different types of polyurethanes is huge. The A vs. B nature of the polymers, however, would make them useful for heterogeneous multilayer soft lithography just as RTV 615 is: by using excess A-A in one layer and excess B-B in the other layer.

e. Silicones:

Silicone polymers probably have the greatest structural variety, and almost certainly have the greatest number of commercially available formulations. The vinyl-to-(Si—H) crosslinking of RTV 615 (which allows both heterogeneous multilayer soft lithography and photoresist encapsulation) has already been discussed, but this is only one of several crosslinking methods used in silicone polymer chemistry.

Cross Linking Agents:

In addition to the use of the simple "pure" polymers discussed above, crosslinking agents may be added. Some agents (like the monomers bearing pendant double bonds for vulcanization) are suitable for allowing homogeneous (A to A) multilayer soft lithography or photoresist encapsulation; in such an approach the same agent is incorporated into both elastomer layers. Complementary agents (i.e. one monomer bearing a pendant double bond, and another bearing a pendant Si—H group) are suitable for heterogeneous (A to B) multilayer soft lithography. In this approach complementary agents are added to adjacent layers.

Other Materials:

In addition, polymers incorporating materials such as chlorosilanes or methyl-, ethyl-, and phenylsilanes, and polydimethylsiloxane (PDMS) such as Dow Chemical Corp. Sylgard 182, 184 or 186, or aliphatic urethane diacrylates such as (but not limited to) Ebecryl 270 or Irr 245 from UCB Chemical may also be used.

Doping and Dilution:

Elastomers may also be "doped" with uncrosslinkable polymer chains of the same class. For instance RTV 615 may be diluted with GE SF96-50 Silicone Fluid. This serves to reduce the viscosity of the uncured elastomer and reduces the Young's modulus of the cured elastomer. Essentially, the crosslink-capable polymer chains are spread further apart by the addition of "inert" polymer chains, so this is called "dilution". RTV 615 cures at up to 90% dilution, with a dramatic reduction in Young's modulus.

Other examples of doping of elastomer material may include the introduction of electrically conducting or magnetic species, as described in detail below in conjunction with alternative methods of actuating the membrane of the device. Should it be desired, doping with fine particles of material having an index of refraction different than the elastomeric material (i.e. silica, diamond, sapphire) is also contemplated as a system for altering the refractive index of the material. Strongly absorbing or opaque particles may be added to render the elastomer colored or opaque to incident radiation, which may be of benefit in an optically addressable system.

Finally, by doping the elastomer with specific chemical species, these doped chemical species may be presented at the elastomer surface, thus serving as anchors or starting points for further chemical derivitization.

Vent Channels

In some embodiments, the FCS device has channels, referred to as "vent channels" positioned to accelerate or facilitate withdrawal of gas from the reaction chamber or channels to facilitate filling (e.g., dead-end or blind filling). See PCT Publication WO 2006/071470, incorporated herein by reference. A vent channel system comprises channels separated from, e.g., a sample (or reagent) bus line by a thin gas permeable (e.g., elastomeric) membrane. The vent channels typically lie over or under a bus line (e.g., in a vent layer or control layer). Vapor and gasses are expelled out of the bus line by passing through an intervening gas permeable material (such as an elastomer), and enters the vent channels(s). Vapor and gasses can diffuse into the vent channel or removal can be accelerated by reducing the pressure in the vent channel relative to the bus line. This reduction can be achieved, for example, by flowing dry gas (e.g., air or $N_2$) through the vent channel(s) or drawing a vacuum through the channel(s), or by any other method that reduces vent channel pressure (including reduction caused by Bernoulli's principle).

The dimensions of vent channels can vary widely. In an exemplary aspect, vent channels have at least one cross-sectional dimension in the range of 0.05 to 1000 microns, often 10 to 500 microns, and most often 50 to 200 microns. In some embodiments, the channel height is not more than about 500 microns or less than about 20 microns (in some embodiments, not more than about 250 microns or less than about 50 microns) and the channel width is not more than 5000 microns or less than 20 microns). In one embodiment, vent channels have rectangular cross-sectional dimensions of about 15 microns×50, microns. In some embodiments, vent channels preferably have width-to-depth ratios of about 1:10 to 100:1, such as between about 2:1 and 1:2, and sometimes about 1:1. In embodiments in which a vacuum is applied to a vent channel dimensions may be selected to avoid collapse of the channel under vacuum (e.g., higher height:width ratios). However, the vent channels are not limited to these particular dimensions or proportions.

As noted above, in some embodiments, the lumen of the vent channel(s) is separated from the interior of the bus line by less than 1000 microns, such as from 0.05 to 1000 microns, often from 1 to 500 microns, often from 1 to 200 microns, and most often from 5 to 50 microns. In one embodiment, a vent is placed below the sample bus line consisting of a group of six 15×50 micron channels separated from the bus line by a 15 micron membrane (gas-permeable). In another embodiment the bus line hexfurcates into six parallel lines (each 50 microns wide) that cross over the six vent lines, thus increasing the amount of membrane area to facilitate vapor and/or gas expulsion With reference to an elastomeric or partially elastomeric device, a system of vent channel can lie in an elastomer layer one side of which constitutes a portion of the interior surface of the bus line. For example, in a "wholly" elastomeric device the vent channels may lie in the elastomer layer above or below the flow channel layer (and, for devices with control channels, on the side of the flow layer opposite the control channel layer or in the control channel layer). Vent channels may also be incorporated into the flow channel layer. In some embodiments, providing vent channels above the bus line is the optimal arrangement. However, it is generally easier to fabricate an MSL chip with the vent below the bus line (e.g., as part of the control layer).

Characteristics and Fabrication of Hybrid and Non-Elastomeric FCS Devices

As noted, a variety of materials can be used in fabrication of the FCS device. Devices can be fabricated from combinations of materials. In a hybrid device channels and/or the reaction chamber may be formed from a non-elastomeric substrate, but the channels and/or the reaction chamber have an elastomeric component sufficient that allows the chambers or reaction channels to be blind filled. For example, in some embodiments the walls and ceiling of a reaction chamber and/or flow channels are elastomeric and the floor of the reactor is formed from an underlying nonelastomeric substrate (e.g., glass), while in other embodiments, both the walls and floors of the reaction chamber and/or flow channels are constructed from a nonelastomeric material, and only the ceiling of the reaction chamber and/or flow channels is constructed from elastomer. These channels and chambers are sometimes referred to as "composite structures." See, e.g., US 20020127736. A variety of approaches can be employed to seal the elastomeric and nonelastomeric components of a device, some of which are described in U.S. Pat. No. 6,719, 868 and US 20020127736, paragraph [0227] et seq.

Valves of various types are known in the art, including micromechanical valves, elastomeric valves, solid-state microvalves, and others. See, e.g., Felton, 2003, The New Generation of Microvalves" *Analytical Chemistry* 429-432. Two common approaches to fabrication of microelectromechanical (MEMS) structures such as pumps and valves are silicon-based bulk micro-machining (which is a subtractive fabrication method whereby single crystal silicon is lithographically patterned and then etched to form three-dimensional structures), and surface micro-machining (which is an additive method where layers of semiconductor-type materials such as polysilicon, silicon nitride, silicon dioxide, and various metals are sequentially added and patterned to make three-dimensional structures).

In addition to elastomeric valves actuated by pressure-based actuation systems, monolithic valves with an elastomeric component and electrostatic, magnetic, electrolytic and electrokinetic actuation systems may be used. See, e.g., US 20020109114; US 20020127736, e.g., at ¶¶0168-0176; and U.S. Pat. No. 6,767,706 B2 e.g., at §6.3. Likewise other types of valves are known in the art and may be used. See, e.g. Jeon et al. U.S. Pat. No. 6,767,194, incorporated herein by reference, and Luo et al. 2003, "Monolithic valves for microfluidic chips based on thermoresponsive polymer gels" *Electrophoresis* 24:3694-3702. Each of the aforementioned references is incorporated herein by reference.

Systems

The FCS device described herein may be used in conjunction with additional elements including components external to the device. Examples of external components include external sensors, external chromatography columns, actuators (e.g., pumps or syringes), control systems for actuating valves, data storage systems, reagent storage units (reservoirs), detection and analysis devices (e.g., a mass spectrophotometer), programmable readers, controllers, and other components known in the art. See, e.g., co-pending and commonly owned U.S. Patent Publication Nos. 2006/0006067, 2007/0074972; 2005/0214173; and 2005/0118073 each of which is incorporated herein for all purposes.

The microfluidic devices utilized in embodiments of the present invention may be further integrated into the carrier devices such as, for example, those described in co-pending and commonly owned U.S. Patent Application No. US2005/0214173A1, incorporated herein for all purposes. These carriers provide on-board continuous fluid pressure to maintain valve closure away from a source of fluid pressure, e.g., house air pressure. Further provided is an automated system for charging and actuating the valves of the present invention as described therein. An another preferred embodiment, the automated system for charging accumulators and actuating valves employs a device having a platen that mates against one or more surfaces of the microfluidic device, wherein the platen has at least two or more ports in fluid communication with a controlled vacuum or pressure source, and may include mechanical portions for manipulating portions of the microfluidic device, for example, but not limited to, check valves.

Another device utilized in embodiments of the present invention provides a carrier used as a substrate for stabilizing an elastomeric block. Preferably the carrier has one or more of the following features; a well or reservoir in fluid communication with the elastomeric block through at least one channel formed in or with the carrier; an accumulator in fluid communication with the elastomeric block through at least one channel formed in or with the carrier; and, a fluid port in fluid communication with the elastomeric block, wherein the fluid port is preferably accessible to an automated source of vacuum or pressure, such as the automated system described above, wherein the automated source further comprises a platen having a port that mates with the fluid port to form an isolated fluid connection between the automated system for applying fluid pressure or vacuum to the elastomeric block. In devices utilized in certain embodiments, the automated source can also make fluid communication with one or more accumulators associated with the carrier for charging and discharging pressure maintained in an accumulator. In certain embodiments, the carrier may further comprise a region located in an area of the carrier that contacts the microfluidic device, wherein the region is made from a material different from another portion of the carrier, the material of the region being selected for improved thermal conduction and distribution properties that are different from the other portion of the carrier. Preferred materials for improved thermal conduction and distribution include, but are not limited to silicon, preferably silicon that is highly polished, such as the type of silicon available in the semiconductor field as a polished wafer or a portion cut from the wafer, e.g., chip.

Embodiments of the present invention utilize a thermal source, for example, but not limited to a PCR thermocycler, which may have been modified from its original manufactured state. Generally the thermal source has a thermally regulated portion that can mate with a portion of the carrier, preferably the thermal conduction and distribution portion of the carrier, for providing thermal control to the elastomeric block through the thermal conduction and distribution portion of the carrier. In a preferred embodiment, thermal contact is improved by applying a source of vacuum to a one or more channels formed within the thermally regulated portion of the thermal source, wherein the channels are formed to contact a surface of the thermal conduction and distribution portion of the carrier to apply suction to and maintain the position of the thermal conduction and distribution portion of the carrier. In a preferred embodiment, the thermal conduction and distribution portion of the carrier is not in physical contact with the remainder of the carrier, but is associated with the remainder of the carrier and the elastomeric block by affixing the thermal conduction and distribution portion to the elastomeric block only and leaving a gap surrounding the edges of the thermal conduction and distribution portion to reduce parasitic thermal effects caused by the carrier.

Because the devices are made of elastomeric materials that are relatively optically transparent, reactions can be readily monitored using a variety of different detection systems at essentially any location on the microfluidic device. Most typically, however, detection occurs at the reaction site itself (e.g., within a region that includes an intersection of flow channels or at the blind end of a flow channel). The fact that the device is manufactured from substantially transparent materials also means that certain detection systems can be utilized with the current devices that are not usable with traditional silicon-based microfluidic devices. Detection can be achieved using detectors that are incorporated into the device or that are separate from the device but aligned with the region of the device to be detected.

Reactions may be designed to produce a detectable signal (indication) including fluorescent indications, but luminescent indications, including chemiluminescent, electroluminescent, electrochemiluminescent, and phospholuminescent, bioluminescent, and other luminescent processes, or any other processing involving any other type of indications that may be detected using a detection device. As will be evident to one of skill in the art, methods and systems operable in the detection and analysis of these fluorescent and luminescent indications are transferable from one indication to another. Additionally, although some embodiments of the present invention utilize spectral filters as optical elements, this is not required by the present invention. Some fluorescent and luminescent applications do not utilize spectral filters in the optical excitation path, the optical emission path, or both. As described herein, other embodiments utilize spectral filters. One of skill in the art will appreciate the differences associated with particular applications.

Although the present invention has been described in detail with reference to specific embodiments, those of skill in the art will recognize that modifications and improvements are within the scope and spirit of the invention, as set forth in the claims which follow. All publications and patent documents (patents, published patent applications, and unpublished patent applications) cited herein are incorporated herein by reference as if each such publication or document was specifically and individually indicated to be incorporated herein by reference. Citation of publications and patent documents is not intended as an admission that any such document is pertinent prior art, nor does it constitute any admission as to the contents or date of the same. The invention having now been described by way of written description and example, those of skill in the art will recognize that the invention can be practiced in a variety of embodiments and that the foregoing description and examples are for purposes of illustration and not limitation of the following claims.

The invention claimed is:

1. A microfluidic method for carrying out sequential binary reactions in a microfluidic device,
said microfluidic device comprising
a plurality of unit cells, wherein each unit cell comprises a flow passage network comprising flow channels and chambers, said network comprising
first, second, third, fourth and fifth flow portions, a first valve disposed between the first and second portions, a second valve disposed between the second and third portions, a third valve disposed between the third and fourth portions, and a fourth valve disposed between the third and fifth portions;
wherein the volume of the fifth portion is greater than the volume of the third portion,
said method comprising:
a) with the first valve closed, introducing a first solution M into the first portion;
b) with the first and second valves closed, introducing a second solution N into the second portion;
c) after Steps (a) and (b), opening the first and second valves, and with the third and fourth valves closed, flowing solution M into said second portion thereby displacing at least a portion of solution N into said third portion, and flowing at least a portion of solution M into said third portion; whereupon the solutions M and N are mixed in the third portion thereby producing solution MN;
d) with the third valve closed, introducing a third solution O into the fourth portion;
e) after Step (c), closing the second valve; and
f) after Steps (d) and (e), with the third and fourth valves open, flowing solution O into said third portion, thereby displacing at least a portion of solution MN into said fifth portion, and flowing at least a portion of solution O into said fifth portion; whereupon the solutions MN and O are mixed in the fifth portion thereby producing solution MNO.

2. The method of claim 1 wherein the first portion is contiguous with the second portion, the second portion is contiguous with the third portion, the third portion is contiguous with the fourth and fifth portions, and the fourth and fifth portions are not contiguous.

3. The method of claim 1 wherein the fifth portion is a chamber with a single intake aperture, wherein liquid in the fifth portion can flow out of the fifth portion only through the single intake aperture.

4. The method of claim 1 wherein said device comprises a sixth flow portion, said six flow portion is contiguous with the fifth portion, and a fifth valve disposed between the fifth and sixth portions.

5. The method of claim 1 wherein said first and second valves are commonly controlled such that they open and close simultaneously, and said third, and fourth valves are commonly controlled such that they open and close simultaneously.

6. The method of claim 5 wherein said first, second, third, and fourth valves each comprise an elastomeric membrane that can be deflected into a region of a microfluidic flow channel disposed between two flow portions, thereby preventing flow of liquid through said region from one flow portion to a contiguous flow portion, wherein each valve operates in response to an actuation force applied to a control channel that traverses the microfluidic flow channel.

7. The method of claim 6 wherein the control channel is orthogonal to the microfluidic flow channel.

8. The method of claim 6 wherein the first and second valves operate in response to an actuation force applied to a first control channel and the third and fourth valves operate in response to an actuation force applied to a second control channel.

9. The method of claim 1 wherein Step (d) is completed prior to the initiation of Step (c).

10. The method of claim 1 wherein Step (b) is carried out before or simultaneously with Step (a).

11. The method of claim 1 wherein essentially all of solution MN is displaced into the fifth portion.

12. The method of claim 1 wherein after Step (c) and before Step (f), with the second, third and fourth valves closed solution MN is heated.

13. The method of claim 12 wherein solution MN is thermocycled.

14. The method of claim 3 wherein after Step (f) the fourth valve is closed and solution MNO is heated.

15. The method of claim 14 wherein solution MNO is thermocycled.

16. The method of claim 1 wherein the third and fifth flow portions, but not the first, second or fourth portions comprise a reaction chamber with at least one cross-sectional dimension greater than 300 microns.

17. The method of claim 1 wherein the fifth flow portion is a reaction chamber comprising at least 12 internal edges.

18. The method of claim 1 further comprising, after Step (f) and with valves 3 and 4 closed, flowing a solution P from a sixth portion into the fifth portion displacing solution MNO out of the fifth portion into a seventh portion and flowing an amount of solution P into said seventh portion, whereupon the seventh portion contains a mixture of solution P and solution MNO.

* * * * *

UNITED STATES PATENT AND TRADEMARK OFFICE
CERTIFICATE OF CORRECTION

| | | |
|---|---|---|
| PATENT NO. | : 8,551,787 B2 | Page 1 of 1 |
| APPLICATION NO. | : 12/804568 | |
| DATED | : October 8, 2013 | |
| INVENTOR(S) | : Andrew May | |

It is certified that error appears in the above-identified patent and that said Letters Patent is hereby corrected as shown below:

In the Claims:

Col. 30, Line 21, Claim 1 should read:

--d) with the third valve closed, introducing a third solution O into the fourth portion;--

Signed and Sealed this
Twenty-eighth Day of January, 2014

Michelle K. Lee
*Deputy Director of the United States Patent and Trademark Office*